United States Patent
Koyama et al.

(10) Patent No.: US 9,627,783 B1
(45) Date of Patent: Apr. 18, 2017

(54) TERMINAL CONNECTION STRUCTURE

(71) Applicant: OMRON Corporation, Kyoto (JP)

(72) Inventors: Taiki Koyama, Okayama (JP); Minoru Kobayashi, Okayama (JP); Akihiro Hozumi, Okayama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/377,116

(22) Filed: Dec. 13, 2016

Related U.S. Application Data

(62) Division of application No. 14/577,104, filed on Dec. 1, 2014, now Pat. No. 9,553,377.

(30) Foreign Application Priority Data

Dec. 27, 2013 (JP) ................. 2013-272139

(51) Int. Cl.
| | | |
|---|---|---|
| H01R 29/00 | (2006.01) | |
| H01R 9/16 | (2006.01) | |
| H01H 9/06 | (2006.01) | |
| H01R 4/48 | (2006.01) | |
| H01R 13/514 | (2006.01) | |
| H01R 13/436 | (2006.01) | |
| H02K 5/22 | (2006.01) | |
| H02K 7/14 | (2006.01) | |
| H02K 11/28 | (2016.01) | |
| H01R 9/18 | (2006.01) | |

(52) U.S. Cl.
CPC .............. *H01R 9/16* (2013.01); *H01H 9/061* (2013.01); *H01H 9/063* (2013.01); *H01R 4/4809* (2013.01); *H01R 9/18* (2013.01); *H01R 13/436* (2013.01); *H01R 13/514* (2013.01); *H02K 5/225* (2013.01); *H02K 7/145* (2013.01); *H02K 11/28* (2016.01); *H01R 2201/10* (2013.01)

(58) Field of Classification Search
CPC .......... H01R 9/16; H01R 9/18; H01R 4/4809; H01R 13/514; H01R 13/436; H01R 10/2201; H02K 5/225; H02K 7/145; H02K 11/28; H01H 9/061; H01H 9/063
USPC ........................................ 439/170–171, 709
See application file for complete search history.

(56) References Cited

U.S. PATENT DOCUMENTS

| | | | | |
|---|---|---|---|---|
| 4,719,395 A | * | 1/1988 | Aoi ........................ | H01H 9/061 318/545 |
| 2006/0243775 A1 | * | 11/2006 | Omori ................... | H01H 9/063 227/176.1 |

FOREIGN PATENT DOCUMENTS

| | | | |
|---|---|---|---|
| EP | 1903588 A1 | * | 3/2008 |
| EP | 2500923 A1 | * | 9/2012 |
| EP | 2819139 A1 | * | 12/2014 |
| JP | 2005073329 A | * | 3/2005 |

* cited by examiner

*Primary Examiner* — Khiem Nguyen
(74) *Attorney, Agent, or Firm* — Osha Liang LLP

(57) ABSTRACT

A terminal connection structure has a housing, a base housed in the housing, and a terminal unit having a pair of tab terminals disposed on the base, a pair of terminal portions disposed in the tab terminals in parallel, each of which is exposed from the housing and configured to be connected to an external terminal, and a terminal plate sandwiched between the pair of tab terminals.

5 Claims, 26 Drawing Sheets

TERMINAL CONNECTION STRUCTURE

BACKGROUND

1. Technical Field

The present invention relates to a connection structure of a terminal such as a relay terminal of an electric power tool.

2. Related Art

In the related art, as connection structures of relay terminals of electric power tools, there is a starter of a single-phase induction motor formed of a main winding and an auxiliary winding, the starter including a positive thermistor serially connected to the auxiliary winding and a socket terminal electrically connected to a detachable connection pin, wherein the socket terminal has a connection pin holding portion formed by bending inward a pair of plates extending sideward in the axial direction of the connection pin, shaping front ends of the plates into an arc so as to conform to the cylindrical shape of the connection pin, and separating the front ends from each other, and the connection pin holding portion is divided into a first front section and a second back section by a slit perpendicular to the axial direction of the connection pin.

Patent Document: Japanese Unexamined Patent Publication No. 2005-73329

SUMMARY

However, the document only discloses that in the above-described relay terminal connection structure, a starter is connected to the single-phase induction motor shown in FIG. 1B of the document. Thus, in order to connect the starter in different connection modes upon request from different clients, a design of the starter needs to be modified. Moreover, intermediate products of the single-phase induction motor that have different relay terminal connection structures need to be stocked for the respective clients.

A terminal connection structure according to one or more embodiments of the present invention is applicable to various connection methods.

A terminal connection structure according to one or more embodiments of the present invention includes: a pair of tab terminals that are provided on a base housed in a housing; and a pair of terminal portions that are provided in the tab terminals in parallel and that are each exposed from the housing so as to be capable of being connected to an external terminal, wherein a terminal unit disposed so as to sandwich a terminal plate with the pair of tab terminals is capable of replacing the base.

Accordingly, since the terminal unit having the pair of tab terminals disposed therein is replaceable, the pair of tab terminals can be selected according to client needs. Therefore, the external terminal can be connected without changing a design of the base, which is convenient.

Moreover, since the base without the terminal unit can be shared, there is no need of stocking intermediate products for each client needs and stock control becomes facilitated.

In one or more embodiments of the present invention, the terminal portions of the pair of tab terminals may extend so as to cross a surface of the housing.

Accordingly, the external terminal can be connected by being pressed onto the surface of the housing, and the work of connecting the external terminal is facilitated.

In one or more embodiments of the present invention, the terminal portions of the pair of tab terminals may extend along the surface of the housing.

Accordingly, options for the connection methods of the external terminal become wide, and the degree of freedom in design increases.

In one or more embodiments of the present invention, a pair of nuts may be disposed between the terminal portions of the pair of tab terminals, and the external terminal may be screwed at the terminal portions via the nuts.

Accordingly, connection strength between the tab terminals and the external terminal becomes high, and a highly-reliable terminal connection structure can be obtained.

Moreover, since the volume including the nuts increases, electric resistance decreases and a heat value generated by current flowing to the tab terminals can also be suppressed, and an excellent heat radiation performance can also be achieved.

In one or more embodiments of the present invention, a pair of springs may be disposed between the terminal portions of the pair of tab terminals, and the external terminal may be crimped to the terminal portions by a spring force of the springs.

Accordingly, since the external terminal can be connected merely by press-fitting the external terminal between the terminal portions of the tab terminals and the springs, a terminal connection structure that enables connection with a single touch and that facilitates the connection work can be obtained.

In one or more embodiments of the present invention, an insulating wall may be disposed between the terminal portions of the pair of tab terminals.

Accordingly, an insulation distance becomes long, and a terminal connection structure having high safety can be obtained.

In one or more embodiments of the present invention, the insulating wall may be formed integrally with a ceiling face of an insulating member having a gate-like cross section.

Accordingly, a terminal unit having a small floor area can be obtained, and a terminal connection structure having a small occupied space can be obtained.

In one or more embodiments of the present invention, the terminal portions of the pair of tab terminals may be inserted into a pair of terminal holes provided in a position restricting plate to restrict positions of the terminal portions.

Accordingly, there is such an effect that the accuracy of positioning the pair of terminal portions becomes high and a terminal connection structure having no variation in the work of connecting to the external terminal can be obtained.

DETAILED DESCRIPTION

Embodiments of the present invention will be described with reference to the appended drawings of FIG. 1 to FIGS. 26A and 26B. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

As shown in FIG. 1 to FIGS. 10A and 10B, a terminal connection structure according to a first embodiment is described in a case of application to a trigger switch for an electric power tool, and particularly in a case where an upwardly-protruding motor tab terminal is formed as a unit.

Figure 4:
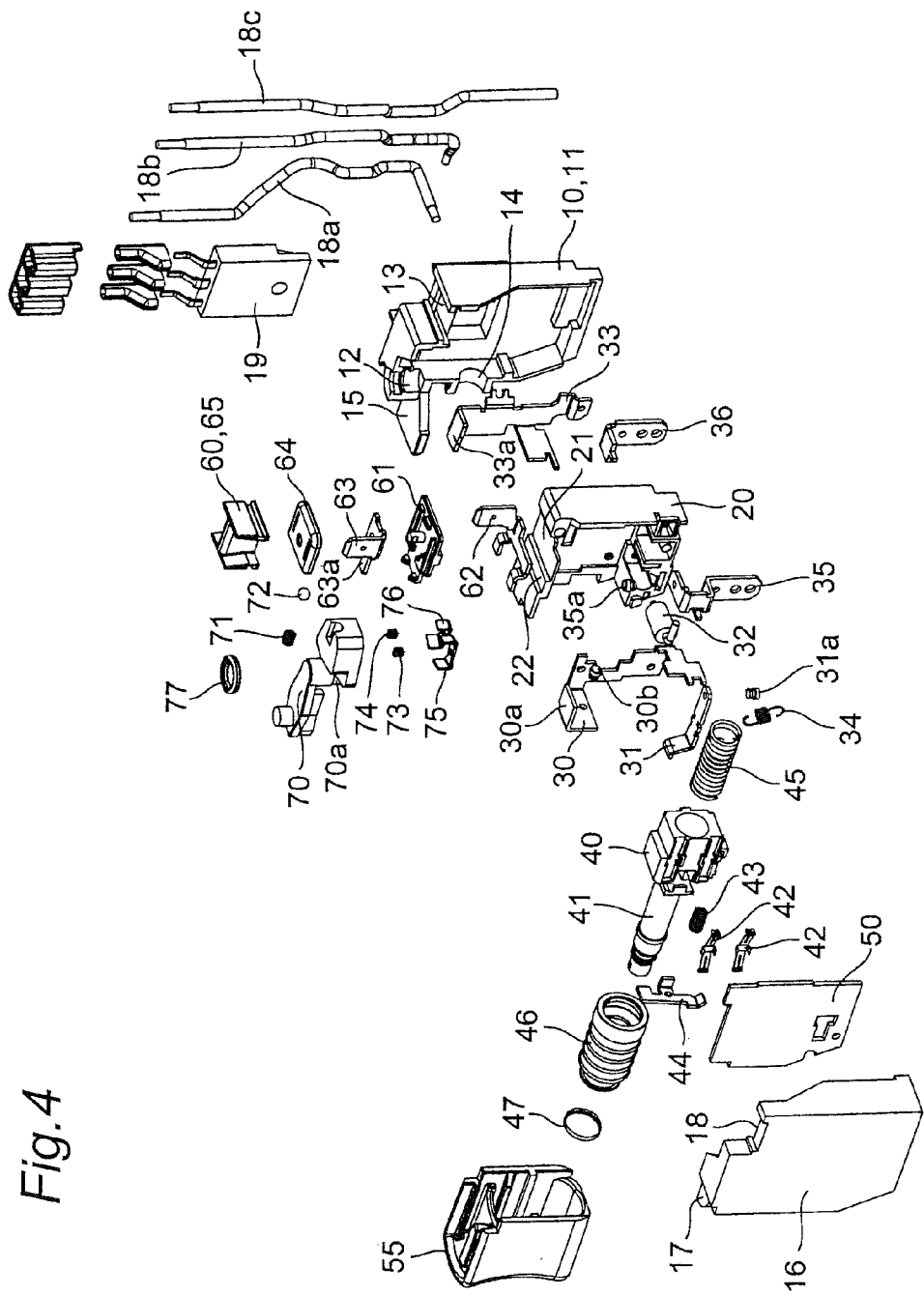
FIG. 4 is an exploded perspective view of the trigger switch shown in FIG. 1.
Figure 5:
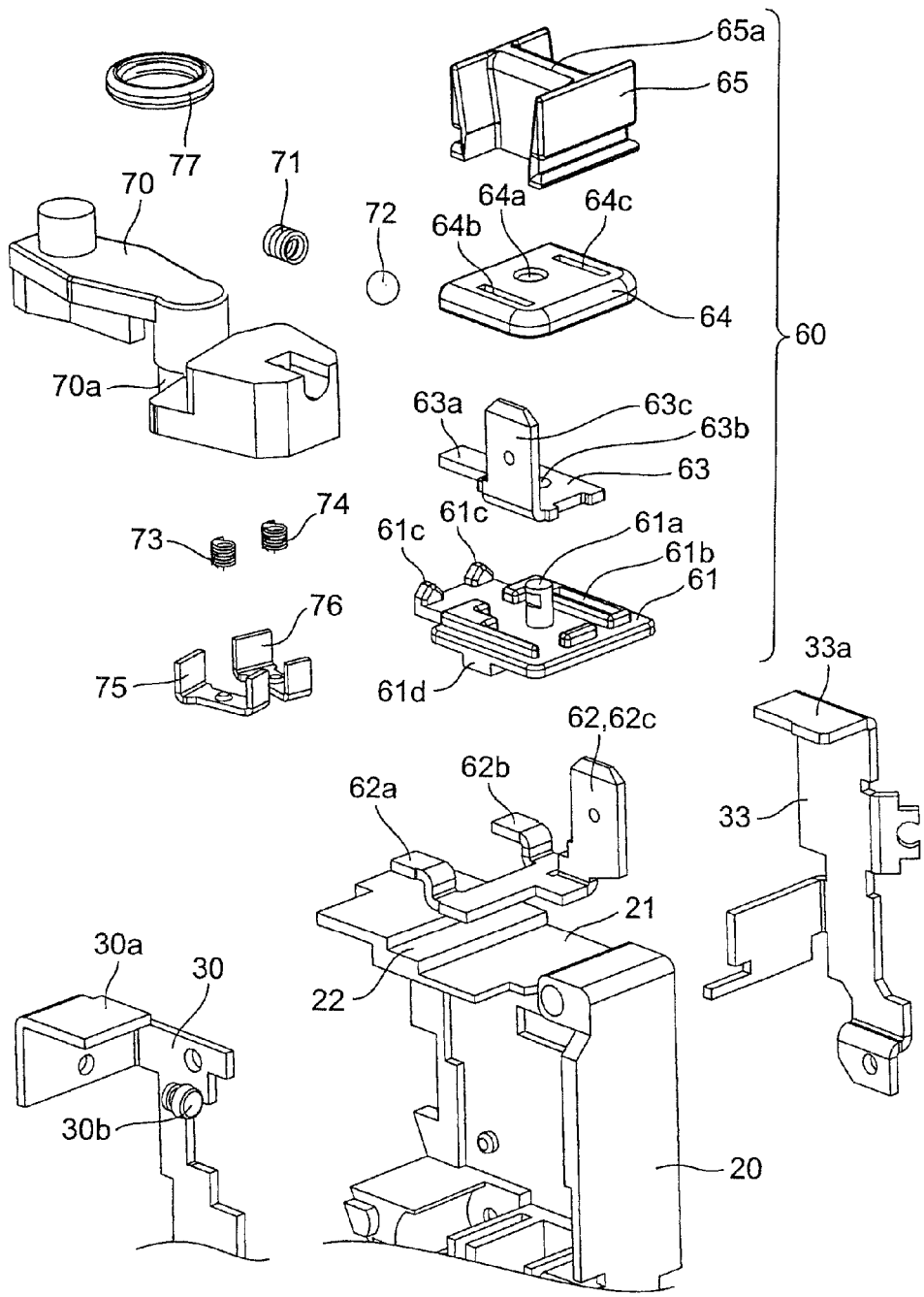
FIG. 5 is a partial enlarged perspective view of the exploded perspective view shown in FIG. 4.

That is, as shown in FIG. 4 and FIG. 5, the trigger switch has inner components incorporated therein, such as a base 20, a plunger 40, and a printed circuit board 50 and the like in a housing 10 formed by combining a first cover 11 and a second cover 16, and has a trigger 55, a terminal unit 60, and an operational lever 70 assembled thereto. Moreover, a socket 19 is connected to the inner components such as the printed circuit board 50 and the like via lead wires 18a, 18b and 18c.

As shown in FIG. 4, the first cover 11 is provided with a semicircular fitting recess 12 for supporting the operational lever 70 (described later) on one side of its upper face, and a notch 13 for exposing the terminal unit 60 (described later) on the other side of its upper face. Moreover, the first cover 11 is provided with a semicircular rib 14 for supporting an operational shaft 41 of the trigger 55 on one outer side face thereof, and has a guide piece 15 provided protruding sideward.

As shown in FIG. 4, the second cover 16 has a front shape that can butt against the first cover 11, and is provided with an fitting recess (not shown) for supporting the operational lever 70 (described later) on one side of its upper face and a semicircular rib 17 for retaining. Moreover, the second cover 16 is provided with a notch 18 for exposing the terminal unit 60 (described later) on the other side of its upper face. Then, the second cover 16 is provided with a semicircular rib (not shown) for supporting the operational shaft 41 of the plunger 40 on one outer side face thereof.

Note that, among joint faces of the second cover 16, a joint face except for a portion where the operational shaft 41 of the plunger 40, the terminal unit 60, and the operational lever 70 are attached, is integrated with the first cover 11 by ultrasound welding or with an adhesive.

As shown in FIG. 4, the base 20 has the substantially inverted C-shaped box-like front, and is provided with a positioning recess 21 on its upper face and a step 22 communicating with the positioning recess 21. The base 20 has a first relay terminal 30 incorporated therein and first and second power terminals 35 and 36 assembled on its lower end.

A fixed contact 30a located at an upper end of the first relay terminal 30 is disposed on one edge of the upper face of the base 20 (FIG. 7), while a movable contact piece 31 is rotatably supported at a lower end of the first relay terminal 30 and is connected to a lower end of a second relay terminal 33 via an electronic component 32. Moreover, a fixed contact 30b is provided on a side face of the first relay terminal 30, while the movable contact piece 31 is biased downward via a biasing spring 34. Then, a movable contact 31a fixed to one end of the movable contact piece 31 is opposed to a fixed contact 35a attached to the first power terminal 35, in such a manner that the movable contact can be in contact with and separated from the fixed contact.

Figure 7:
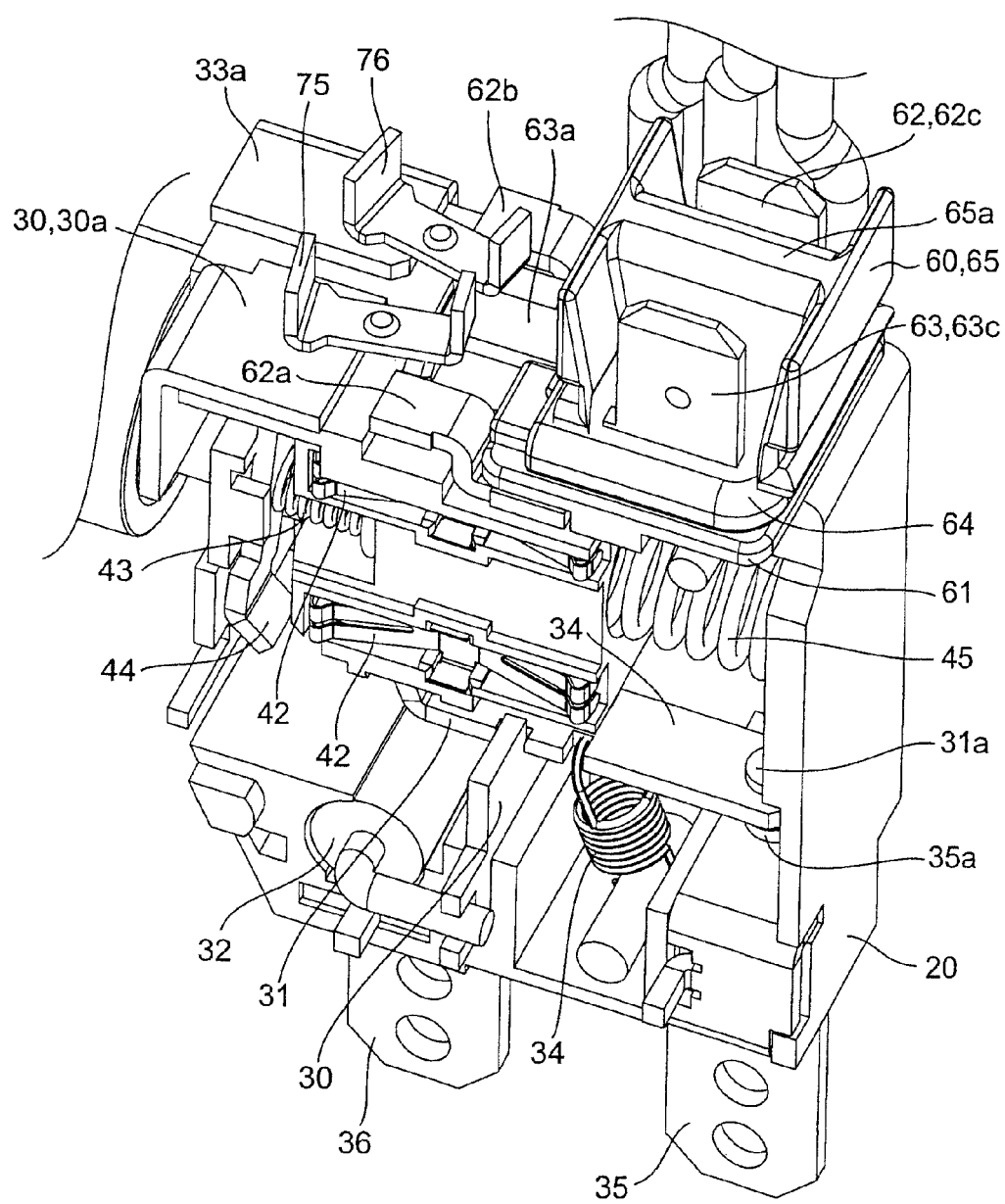
FIG. 7 is an enlarged perspective view of a main section of the trigger switch shown in FIG. 1.
Figure 8A:
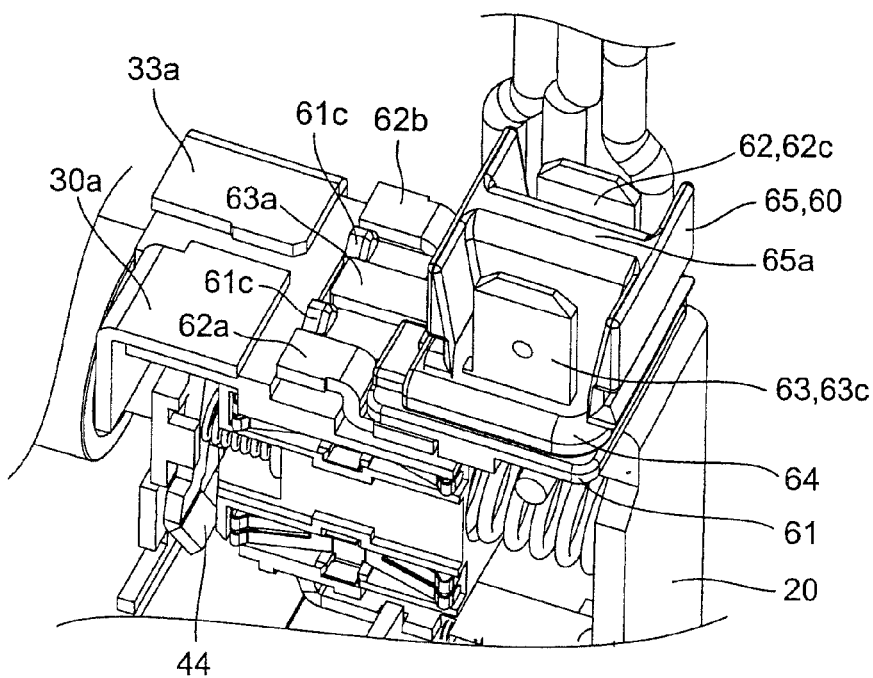
FIGS. 8A and 8B are enlarged perspective views of the main section of the trigger switch shown in FIG. 1.
Figure 8B:
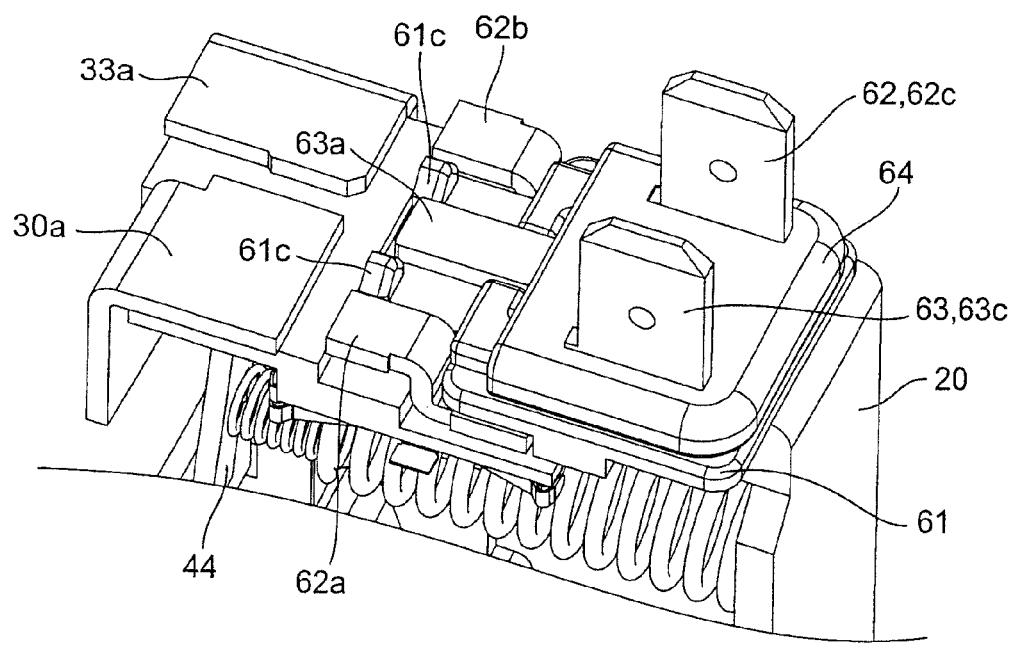
Figure 9A:
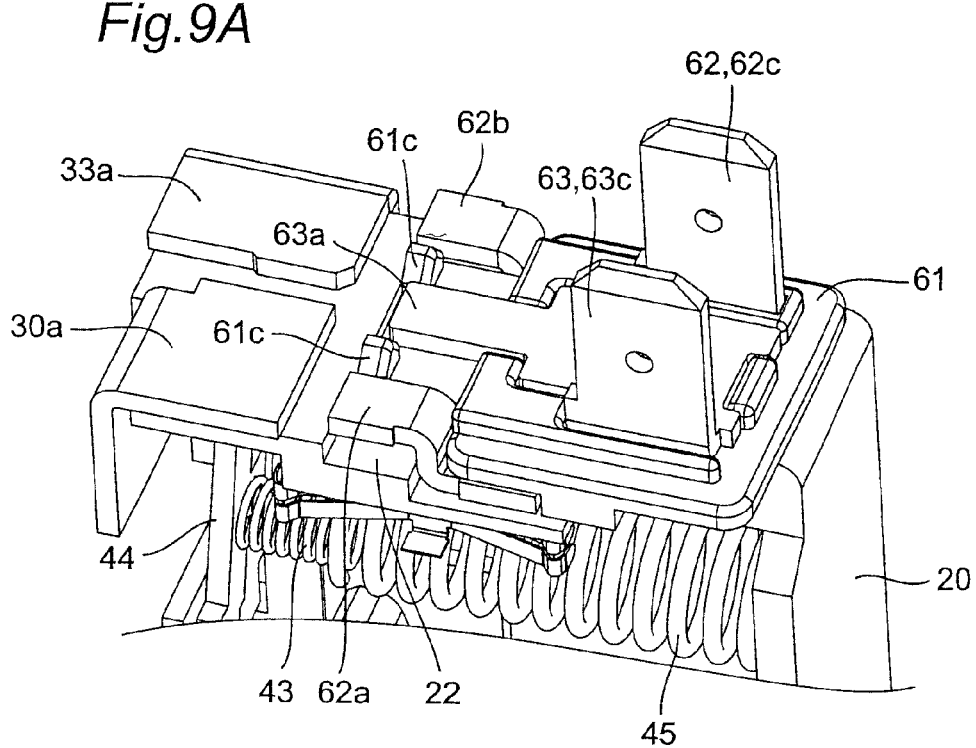
FIGS. 9A and 9B are enlarged perspective views of the main section of the trigger switch shown in FIG. 1.
Figure 9B:
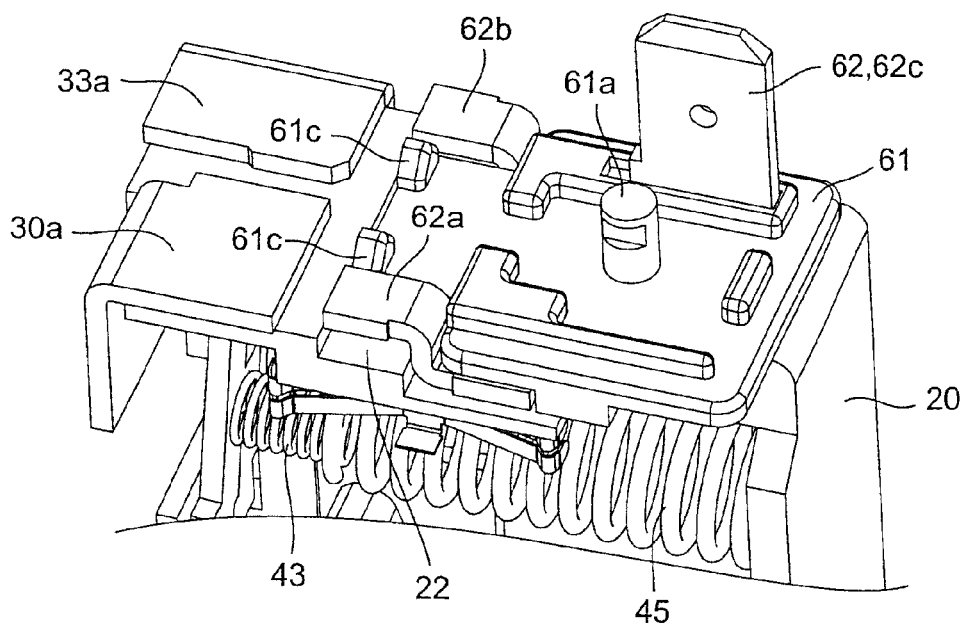
Figure 10A:
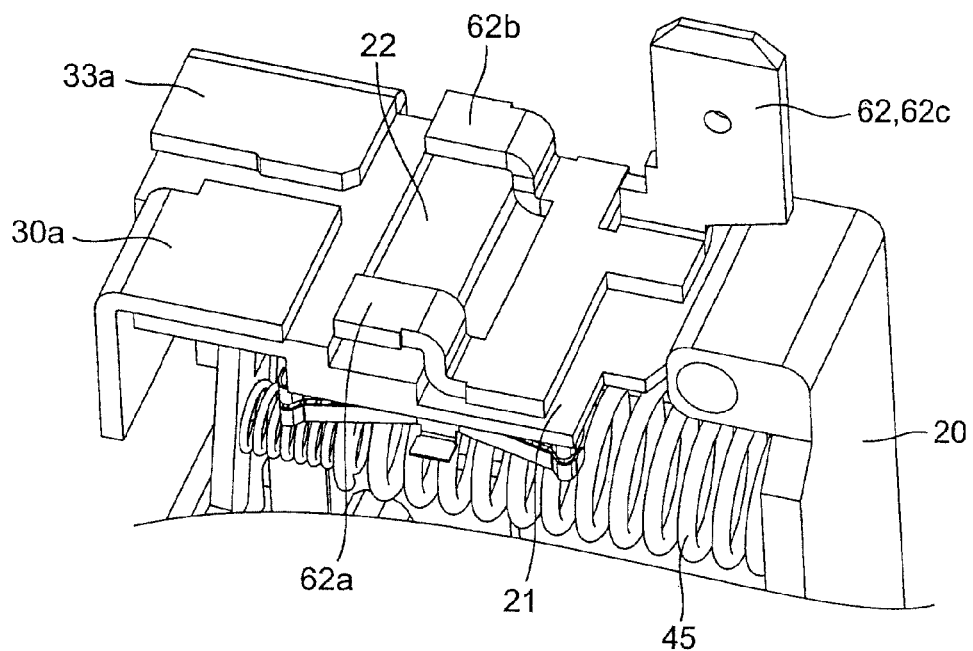
FIGS. 10A and 10B are enlarged perspective views of the main section of the trigger switch shown in FIG. 1.
Figure 10B:
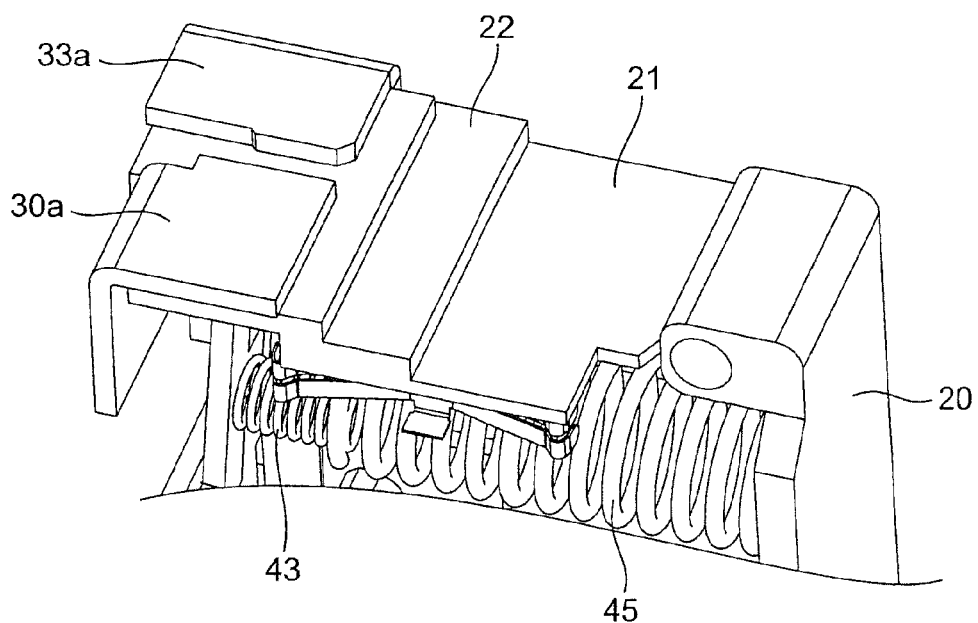
Figure 11:
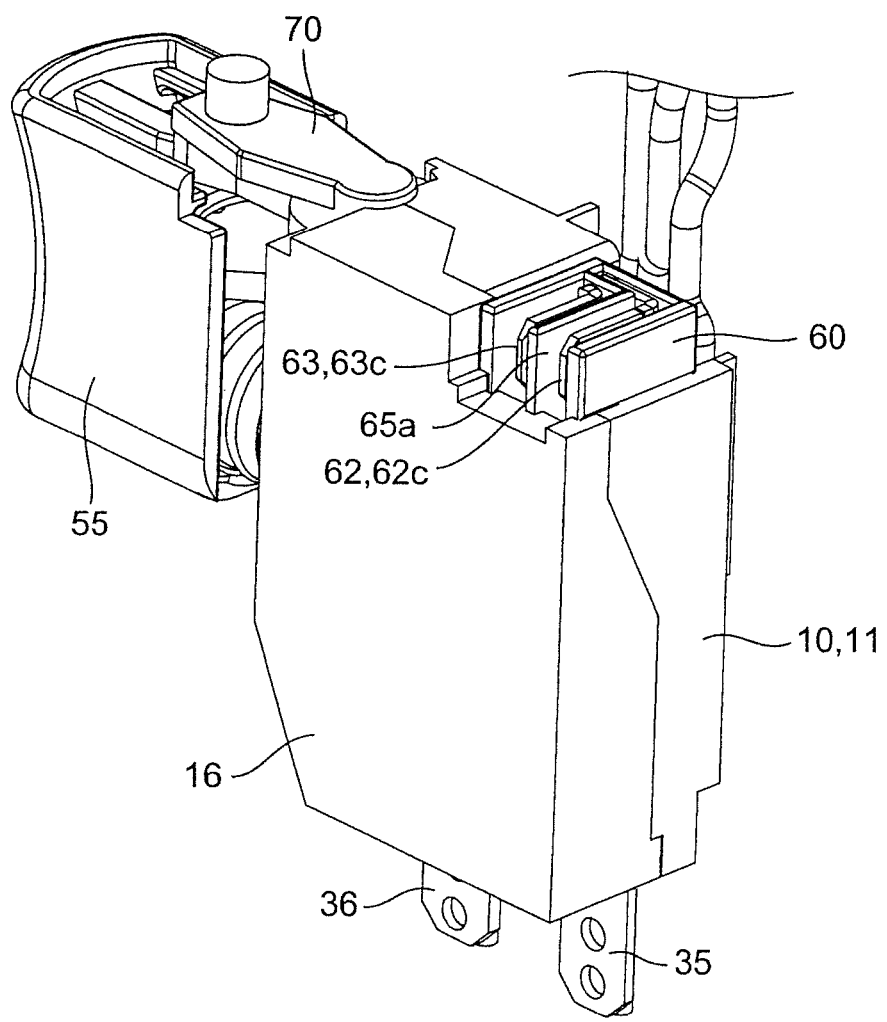
FIG. 11 is a perspective view of a trigger switch in a second embodiment of the present invention.

The second relay terminal 33 is attached to an outer side face of the base 20, and a fixed contact 33a located at an upper end of the second relay terminal 33 is disposed on one edge of the upper face of the base 20, and is disposed in parallel to the fixed contact 30a (FIG. 7).

As shown in FIG. 4, the plunger 40 includes the sideward-protruding operational shaft 41, and has a pair of wipers 42 and 42 incorporated in its outer side face. Moreover, as shown in FIG. 7, the plunger 40 has a movable contact piece 44 incorporated therein via a small coil spring 43. The movable contact piece 44 has a function of passing current to reversely rotate the motor and suddenly stopping the motor by contacting the fixed contact 30b provided in the first relay terminal 30 at return of the plunger 40.

Figure 1:
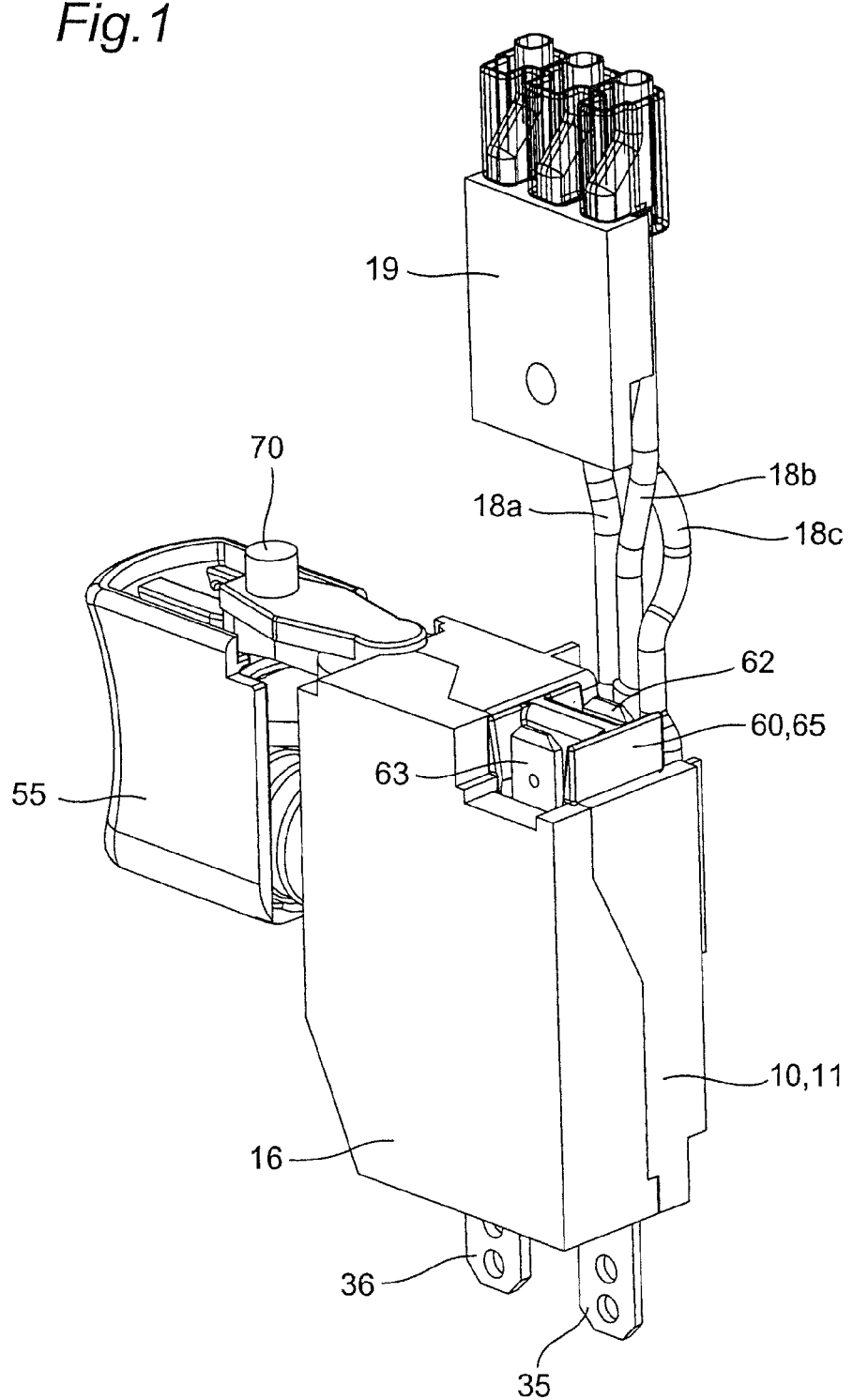
FIG. 1 is a perspective view of a trigger switch in a first embodiment of the present invention.
Figure 2:
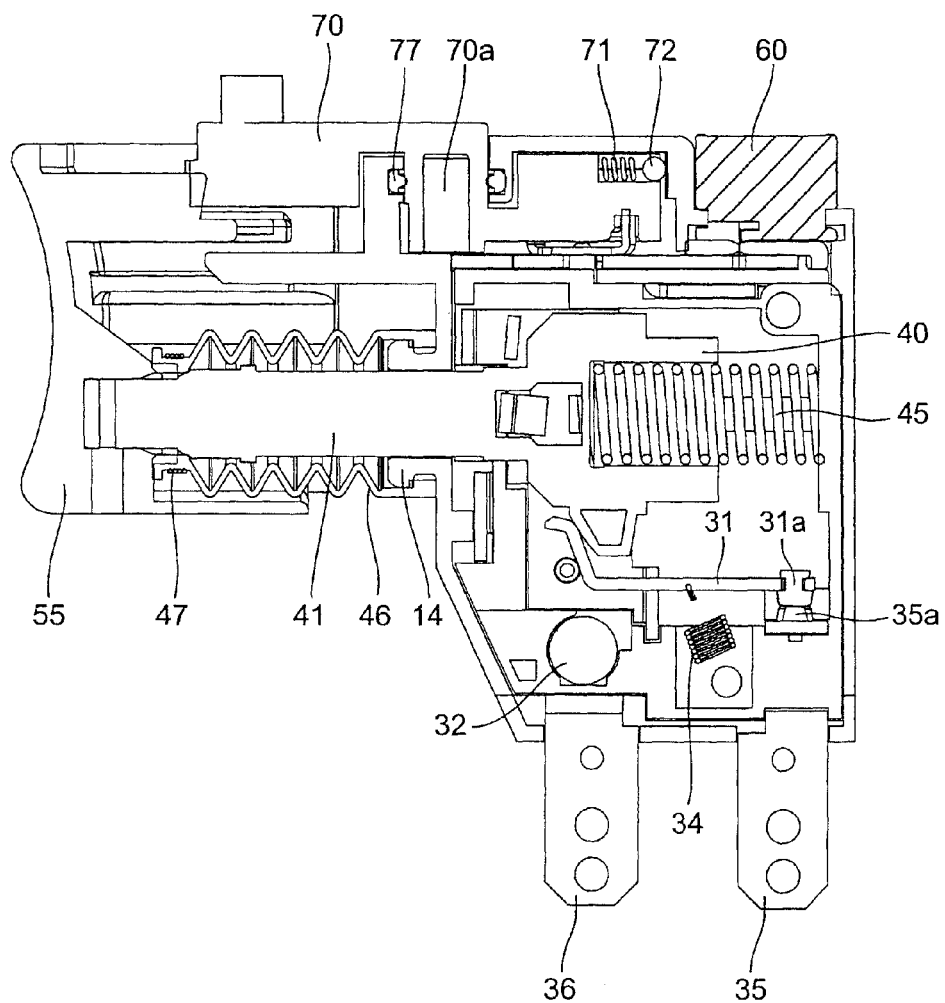
FIG. 2 is a front sectional view of the trigger switch shown in FIG. 1.
Figure 3:
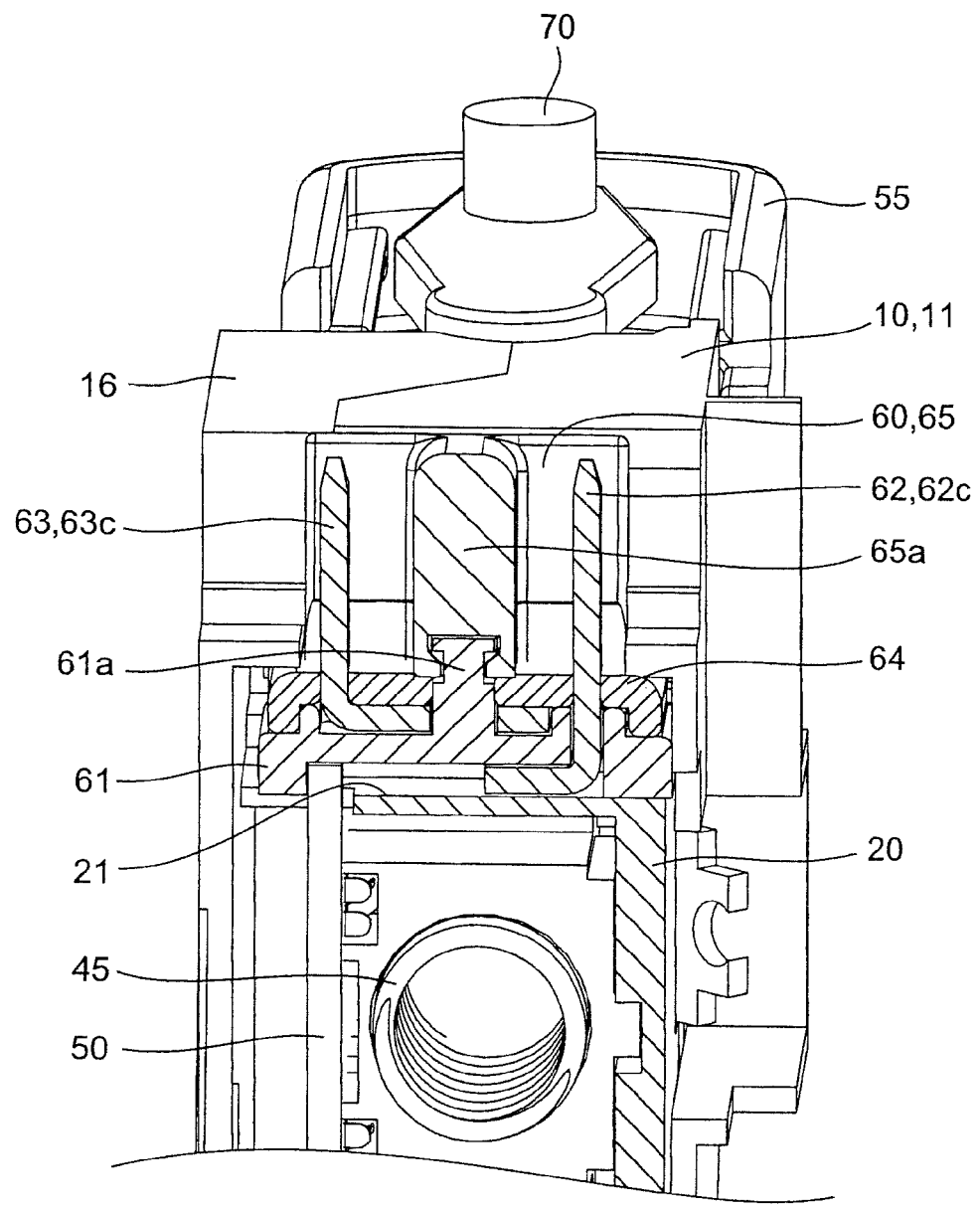
FIG. 3 is a partial sectional perspective view of a right side face of the trigger switch shown in FIG. 1.

Then, as shown in FIG. 2, the plunger 40 is fitted into the base 20 via a large coil spring 45 in a manner slidable in an axial direction. Therefore, as the plunger 40 slides, the pair of wipers 42 and 42 attached to the plunger 40 slide along a sliding resistor (not shown) of the printed circuit board 50 (described later) to change a resistance value.

Figure 6:
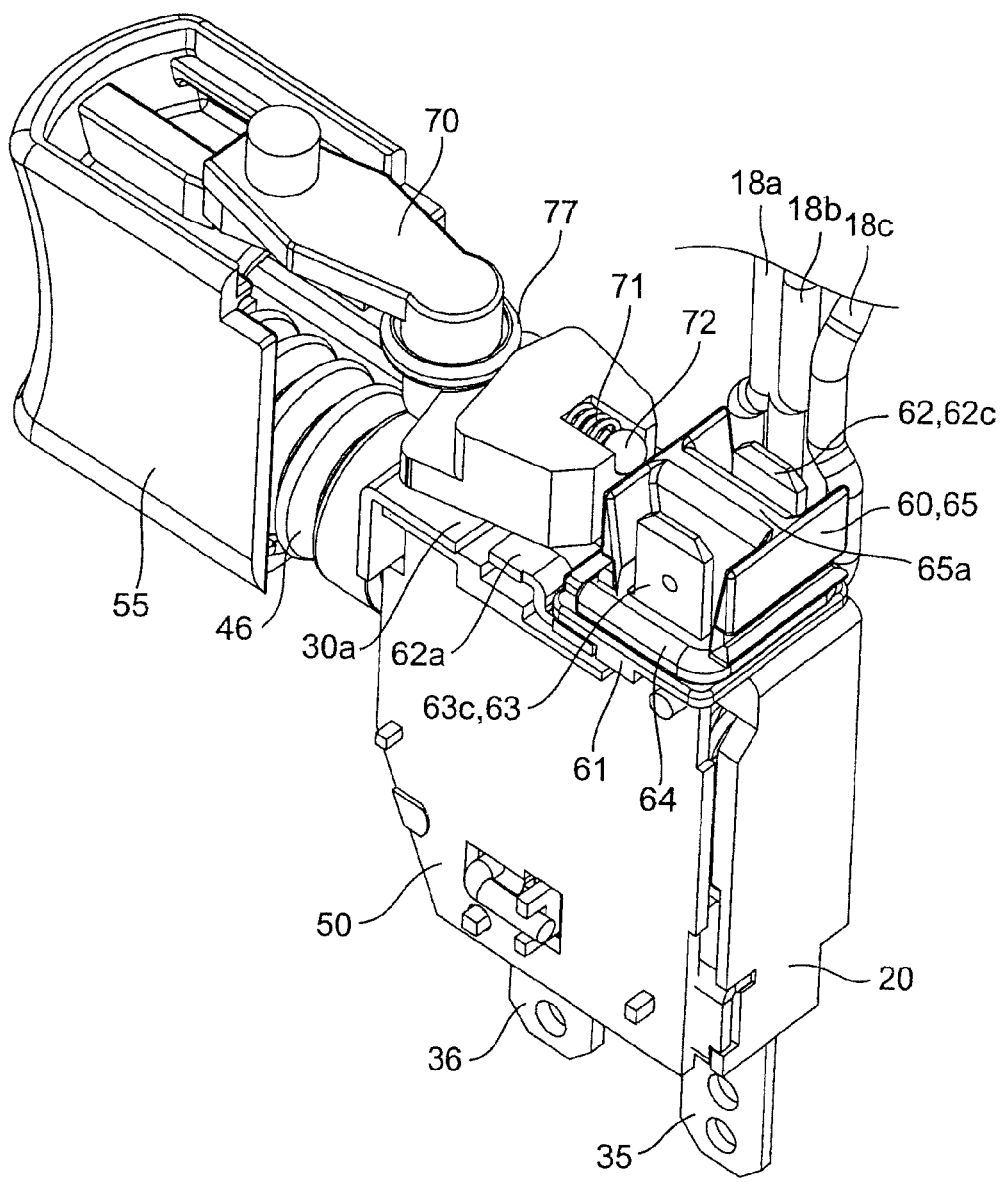
FIG. 6 is a perspective view showing a state where a housing is removed from the trigger switch shown in FIG. 1.

As shown in FIG. 6, the printed circuit board 50 has a front shape that can cover an opening of the base 20, and the sliding resistor (not shown) is printed on an inner face of the printed circuit board 50. Then, the printed circuit board 50 is integrated with the base 20 by being fitted into and assembled to the base 20 that houses the plunger 40.

As shown in FIG. 2, the trigger 55 engages with a free end of the operational shaft 41 of the plunger 40. Therefore, the trigger 55 and the plunger 40 are biased so as to be pushed outward from the housing 10 via the large coil spring 45.

Note that a bellows tube 46 inserted into the operational shaft 41 is retained in the trigger 55 via a retaining coil ring 47 at one end thereof, while engaging with the semicircular rib 14 of the first and second covers 11 and 16 at the other end thereof.

As shown in FIG. 5, the terminal unit 60 includes a terminal plate 61, a tab terminal 62, a common tab terminal 63, a position restricting plate 64, and an insulating member 65.

That is, the terminal plate 61 is provided with a terminal hole 61b on one side of a spindle 61a provided protruding at the center of its upper face, and has a pair of click-feeling protrusions 61c and 61c provided protruding on the other edge, and a projection 61d provided protruding on its lower face. Moreover, in the tab terminal 62, a pair of first and second fixed contacts 62a and 62b extend in parallel, and a terminal portion 62c is bent upward. Then, the tub terminal 62 is assembled by inserting the terminal portion 62c into the terminal hole 61b of the terminal plate 61 from below. Then, the common tab terminal 63 has a common fixed contact 63a at a front end of its horizontal portion, and is provided with a through hole 63b at the center of its horizontal portion, and an upwardly-bent terminal portion 63c. Further, the position restricting plate 64 is provided with a through hole 64a at the center thereof and terminal holes 64b and 64c on both sides thereof. Subsequently, the insulating member 65 has a substantially H-shaped plane that can be placed on the position restricting plate 64, and has an insulating wall 65a at the center thereof.

Therefore, in the terminal unit 60, the terminal portion 62c of the tab terminal 62 is inserted into the terminal hole 61b of the terminal plate 61 from below, and the spindle 61a of the terminal plate 61 is fitted into the through hole 63b of the common tab terminal 63. Subsequently, the terminal portions 62c and 63c are fitted into the terminal holes 64c and 64b of the position restricting plate 64, respectively, to restrict positions of the terminal portions, and thereafter the insulating member 65 having a substantially H-shaped plane is placed on the position restricting plate 64, whereby the terminal portions 62c and 63c are partitioned by the insulating wall 65a of the insulating member 65 (FIG. 3) and the work of assembling the terminal unit 60 is completed.

As shown in FIG. 4 and FIG. 5, the operational lever 70 has a corundum 72 assembled at one end thereof so as to bias the corundum 72 outward via an operational lever coil spring 71, and has a pair of first and second rotational contact pieces 75 and 76 assembled on a lower face of the one end thereof via switching coil springs 73 and 74.

Then, a rotational shaft 70a provided protruding under a brim of the operational lever 70 is rotatably supported in the semicircular fitting recess 12 of the first and second covers 11 and 16 via a seal ring 77. Therefore, when the operational lever 70 is rotated about the rotational shaft 70a, the first and second rotational contact pieces 75 and 76 rotate as shown in FIG. 7. Consequently, the fixed contacts 30a and 33a of the first and second relay terminals 30 and 33, the first and second fixed contacts 62a and 62b of the tab terminal 62, and the common fixed contact 63a of the common tab terminal 63 are alternately switched, and the rotational direction of the motor can be reversed.

In an assembling method, first, the first and second relay terminals 30 and 33 are assembled to the base 20, and the plunger 40 to which the trigger 55 and the bellows tube 46 are attached, and the printed circuit board 50 are assembled. Further, the terminal unit 60 is installed in the positioning recess 21 provided on the upper face of the base 20. Thus, the projection 61d of the terminal plate 61 abuts against a bottom face of the positioning recess 21, and one edge of the terminal plate 61 is placed on the step 22 of the base 20. Therefore, the fixed contacts 30a and 33a of the first and second relay terminals 30 and 33, the first and second fixed contacts 62a and 62b of the tab terminal 62, and the common fixed contact 63a of the common tab terminal 63 become flush with one another.

Meanwhile, the switching coil springs 73 and 74, the first and second rotational contact pieces 75 and 76, the operational lever coil spring 71, and the corundum 72 are incorporated into the operational lever 70. Then, the operational lever 70 is assembled to the base 20, and thereafter the first and second covers 11 and 16 are assembled from both sides of the base 20 to retain the plunger 40, the terminal unit 60, and the operational lever 70. Subsequently, the first and second covers 11 and 16 are joined to each other by ultrasound welding or with an adhesive, whereby the assembling work is completed.

Next, the operation of the trigger switch will be briefly described.

When the operational lever 70 is located at a neutral position as shown in FIG. 6, one end of the operational lever 70 abuts against a central protrusion of the trigger 55, whereby the trigger 55 is hindered from being pulled in and an erroneous operation is prevented.

Then, the operational lever 70 is rotated counterclockwise from the state shown in FIG. 7, whereby the first rotational contact piece 75 contacts the fixed contact 30a and the common fixed contact 63a, and the second rotational contact piece 76 contacts the fixed contact 33a and the second fixed contact 62b. Subsequently, immediately before the trigger 55 is pulled in, the wipers 42 and 42 contact the sliding resistor (not shown) of the printed circuit board 50 at a maximum resistance value. Meanwhile, a position of the movable contact piece 31 is restricted by the plunger 40 biased by the large coil spring 45, and the movable contact 31a is separated from the fixed contact 35a while the movable contact piece 44 is in contact with the fixed contact 30b by a spring force of the small coil spring 43.

First, when an operator slightly pulls the trigger 55 in, the plunger 40 engaging with the operational shaft 41 slides. At this time, the movable contact piece 31 rotates and the movable contact 31a contacts the fixed contact 35a, thereby a circuit current starts flowing.

Then, at the moment that the trigger 55 is pulled in and the wipers 42 and 42 assembled to the plunger 40 contact the sliding resistor of the printed circuit board 50, the motor (not shown) starts to rotate at a low speed. Then, as the wipers 42 and 42 slide, the resistance becomes smaller, the flowing current increases, and the number of revolutions of the motor increases.

When the trigger 55 is further pulled in and the operational shaft 41 is pushed to the back side of the base 20, the sliding resistance value becomes nearly zero, maximum current flows, and the number of revolutions of the motor becomes maximized.

Subsequently, when the operator releases the force to pull the trigger 55 in, the plunger 40 and the operational shaft 41 are pushed back by the spring force of the large coil spring 45, and rotation of the motor gradually becomes slow. Then, at return to the original state, the movable contact 31a of the movable contact piece 31 is separated from the fixed contact 35a, and thereafter the movable contact piece 44 contacts the fixed contact 30b. Current to rotate the motor in the reverse direction flows, and the motor securely stops.

Moreover, the operational lever 70 is rotated clockwise about the rotational shaft 70a, whereby the first rotational contact piece 75 passes over the click-feeling protrusions 61c and contacts the fixed contact 30a and the first fixed contact 62a. Meanwhile, the second rotational contact piece 76 passes over the click-feeling protrusions 61c and contacts the fixed contact 33a and the common fixed contact 63a. Therefore, when the trigger 55 is pulled in as described above, the motor reversely rotates.

As shown in FIG. 11 to FIG. 15, a second embodiment is substantially the same as the above-described first embodiment except that a tab terminal protrudes sideward.

Figure 13:
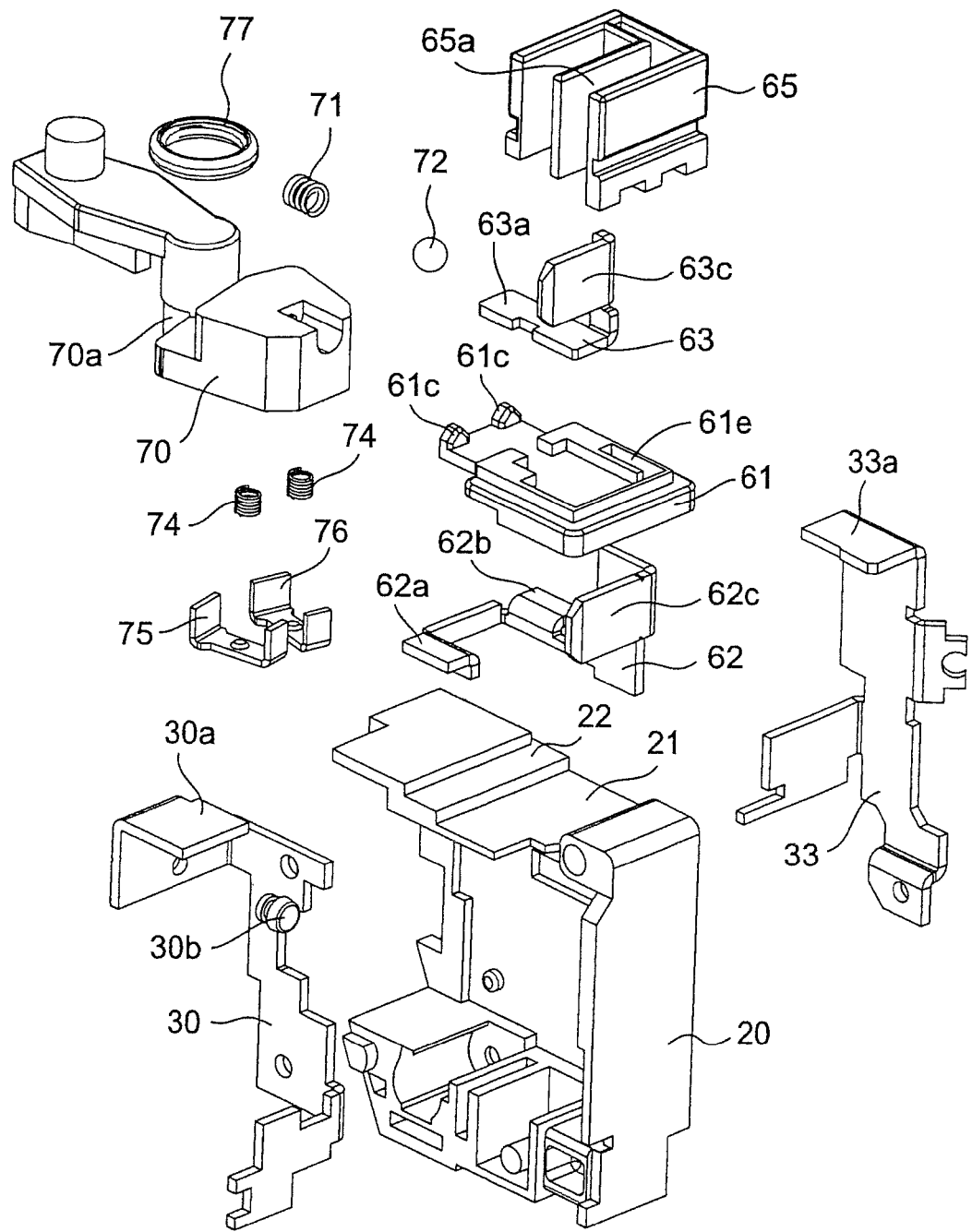
FIG. 13 is an exploded perspective view of a main section of the trigger switch shown in FIG. 11.
Figure 14:
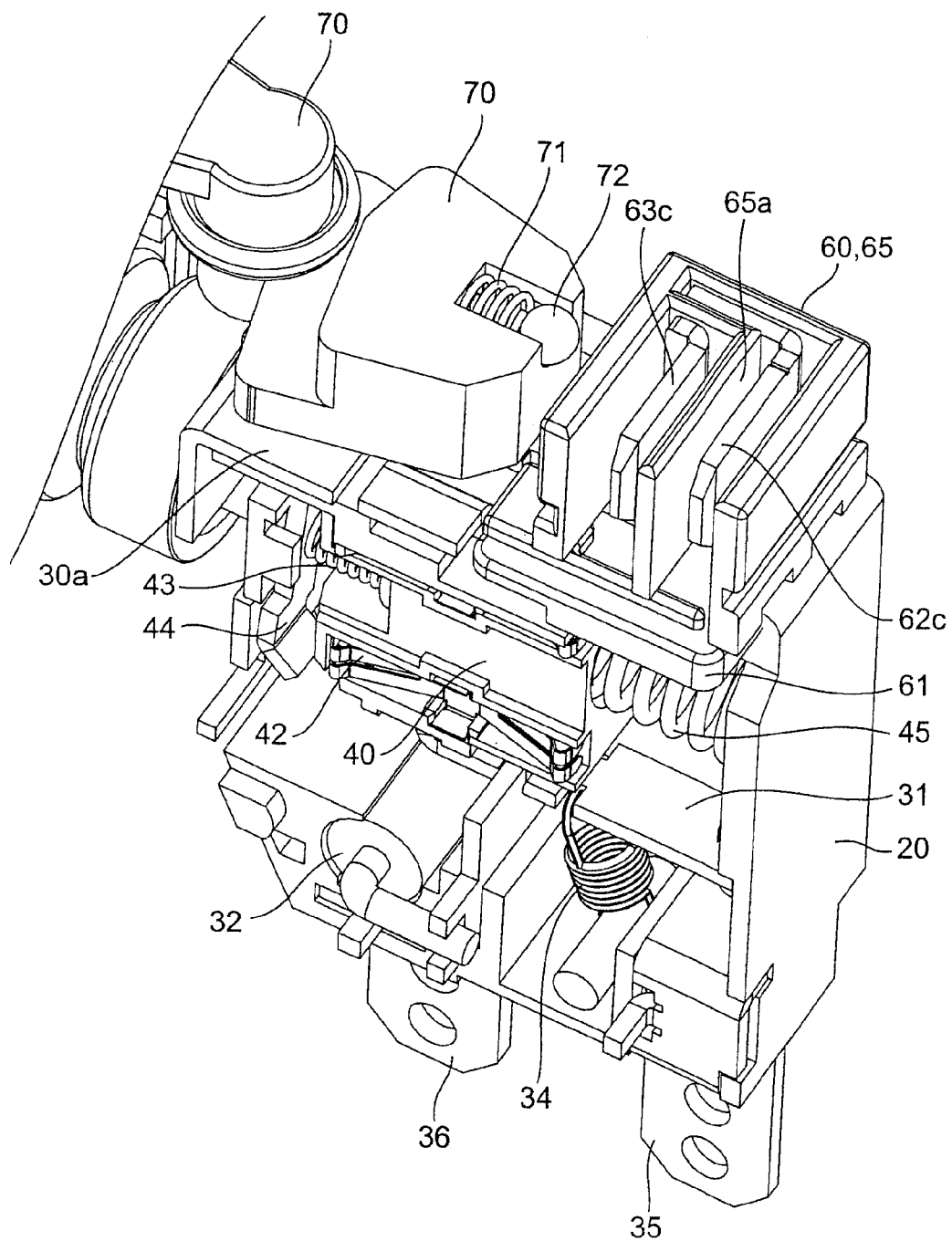
FIG. 14 is an enlarged perspective view of the main section showing a state where a housing and the like are removed from the trigger switch shown in FIG. 11.
Figure 15:
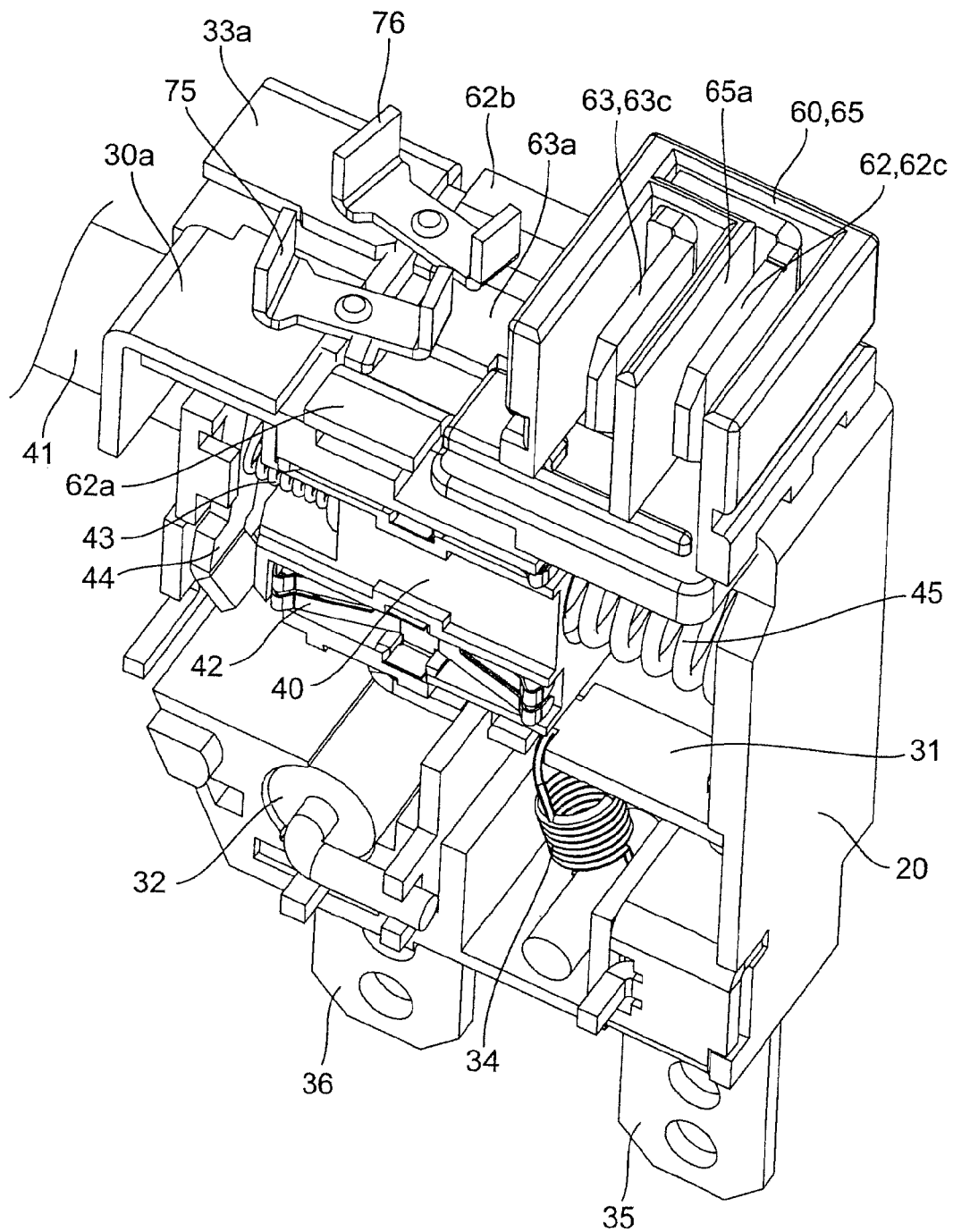
FIG. 15 is an enlarged perspective view of the main section of the trigger switch shown in FIG. 11.
Figure 16:
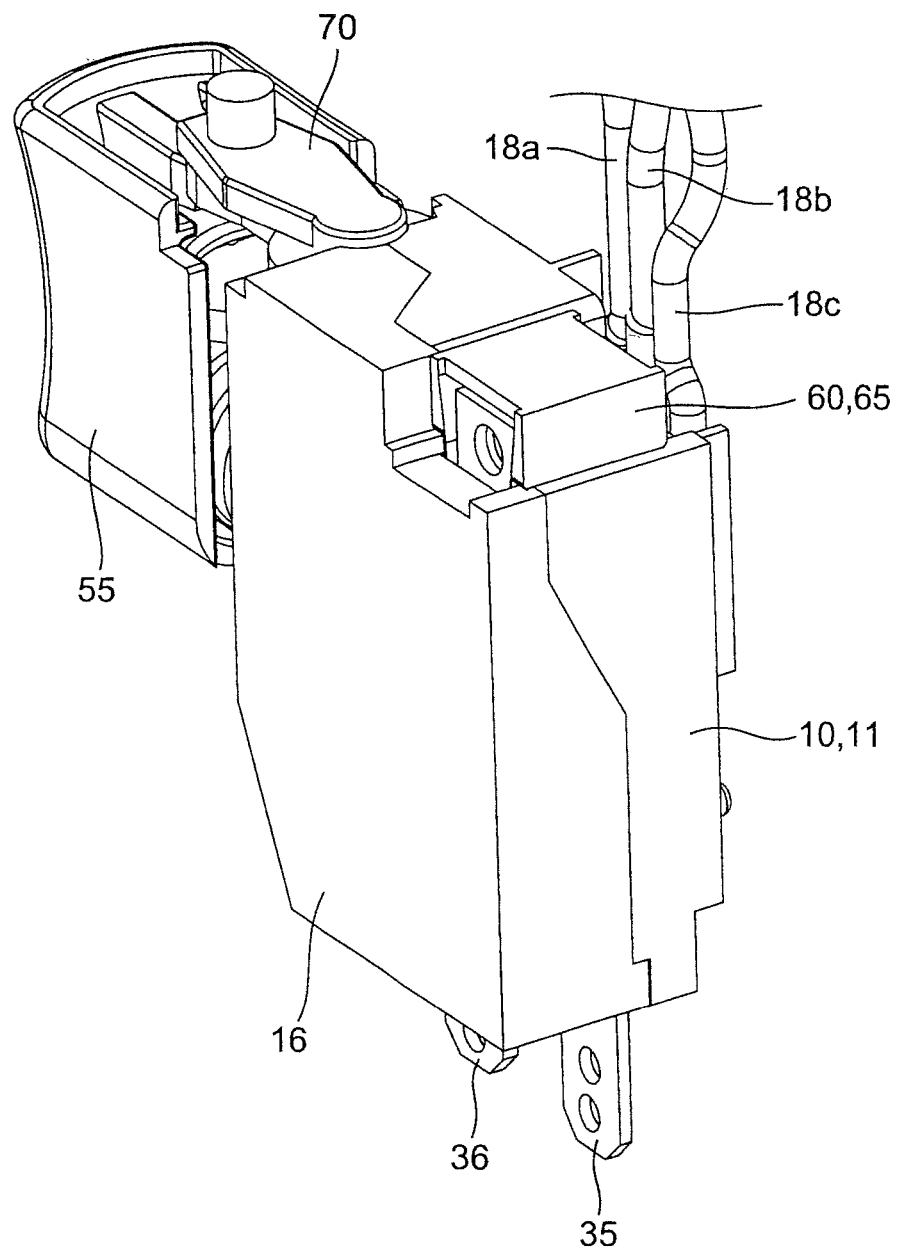
FIG. 16 is a perspective view of a trigger switch in a third embodiment of the present invention.
Figure 17:
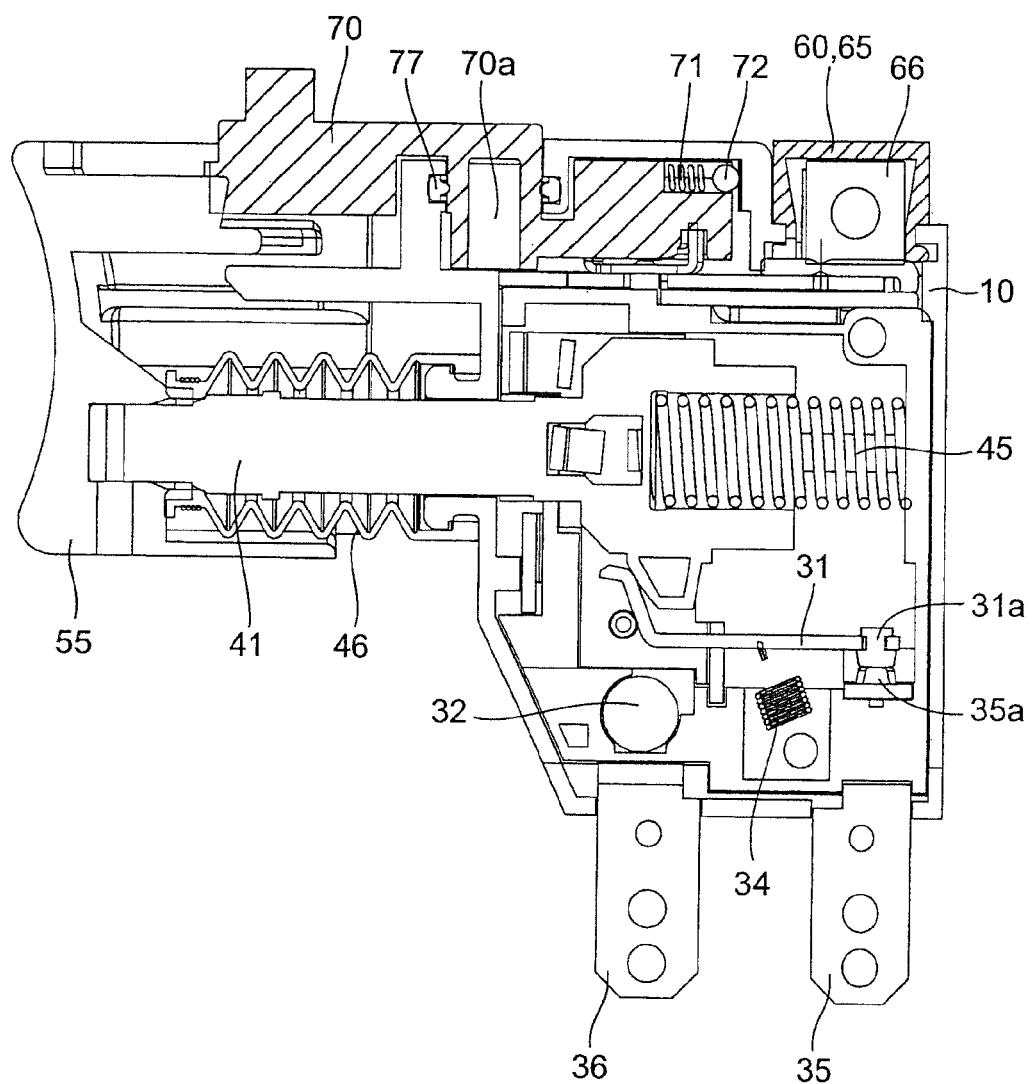
FIG. 17 is a front sectional view of the trigger switch shown in FIG. 16.

That is, as shown in FIG. 13, a terminal plate 61 of a terminal unit 60 is provided with a substantially L-shaped terminal slit 61e on one edge of its upper face, and has a pair of click-feeling protrusions 61c and 61c provided protruding on the other edge. Moreover, one end of a tab terminal 62 horizontally extends and is bent into a substantially inverted C-shape, whereby a pair of first and second fixed contacts 62a and 62b are formed in parallel, and a terminal portion 62c is bent into a substantially L-shaped plane. Then, the tab terminal 62 is assembled by inserting the terminal portion 62c into the terminal slit 61e of the terminal plate 61. Moreover, a common tab terminal 63 has a common fixed contact 63a at a front end of its horizontal section, and a terminal portion 63c formed by bending its vertical section into a substantially L-shaped plane. Furthermore, in the second embodiment, the position restricting plate is not provided, but an insulating member 65 is provided. The insulating member 65 is a frame having a substantially C-shaped plane, and has an insulating wall 65a having a substantially L-shaped plane and formed integrally with the inside of the frame.

Figure 12:
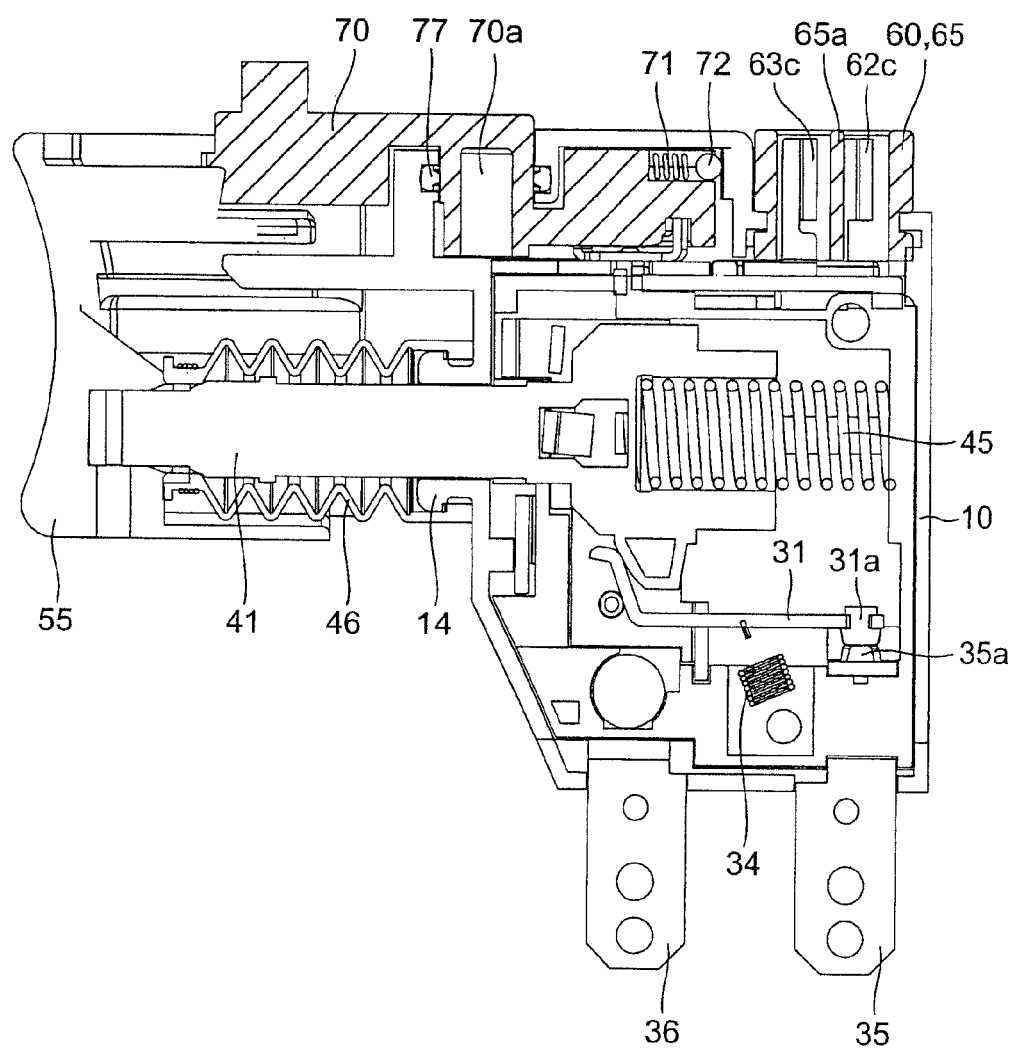
FIG. 12 is a front sectional view of the trigger switch shown in FIG. 11.

Therefore, in the terminal unit 60, the terminal portion 62c of the tab terminal 62 is inserted into the terminal slit 61e of the terminal plate 61 from below. Further, by placing and positioning the common tab terminal 63 on the upper face of the terminal plate 61 and placing the insulating member 65 thereon, the terminal portions 62c and 63c are partitioned by the insulating wall 65a (FIG. 12). The other members are assembled in substantially the same manner as in the first embodiment, whereby the assembling work is completed.

Note that other members are the same as those in the first embodiment and thus, the same parts are given the same reference numerals and description thereof is omitted.

According to the second embodiment, an outside socket can be press-fitted from the side and connected to the terminal portion 62c of the tab terminal 62 and the terminal portion 63c of the common tab terminal 63. Therefore, since options for the connection methods become wide to provide convenience and also a main body of the trigger switch except for the terminal unit can be shared, there is such an advantage that stock of intermediate products of the trigger switch can be reduced.

As shown in FIG. 16 to FIGS. 21A and 21B, a third embodiment is substantially the same as the above-described first embodiment except that a tab terminal is a nut terminal.

Figure 19:
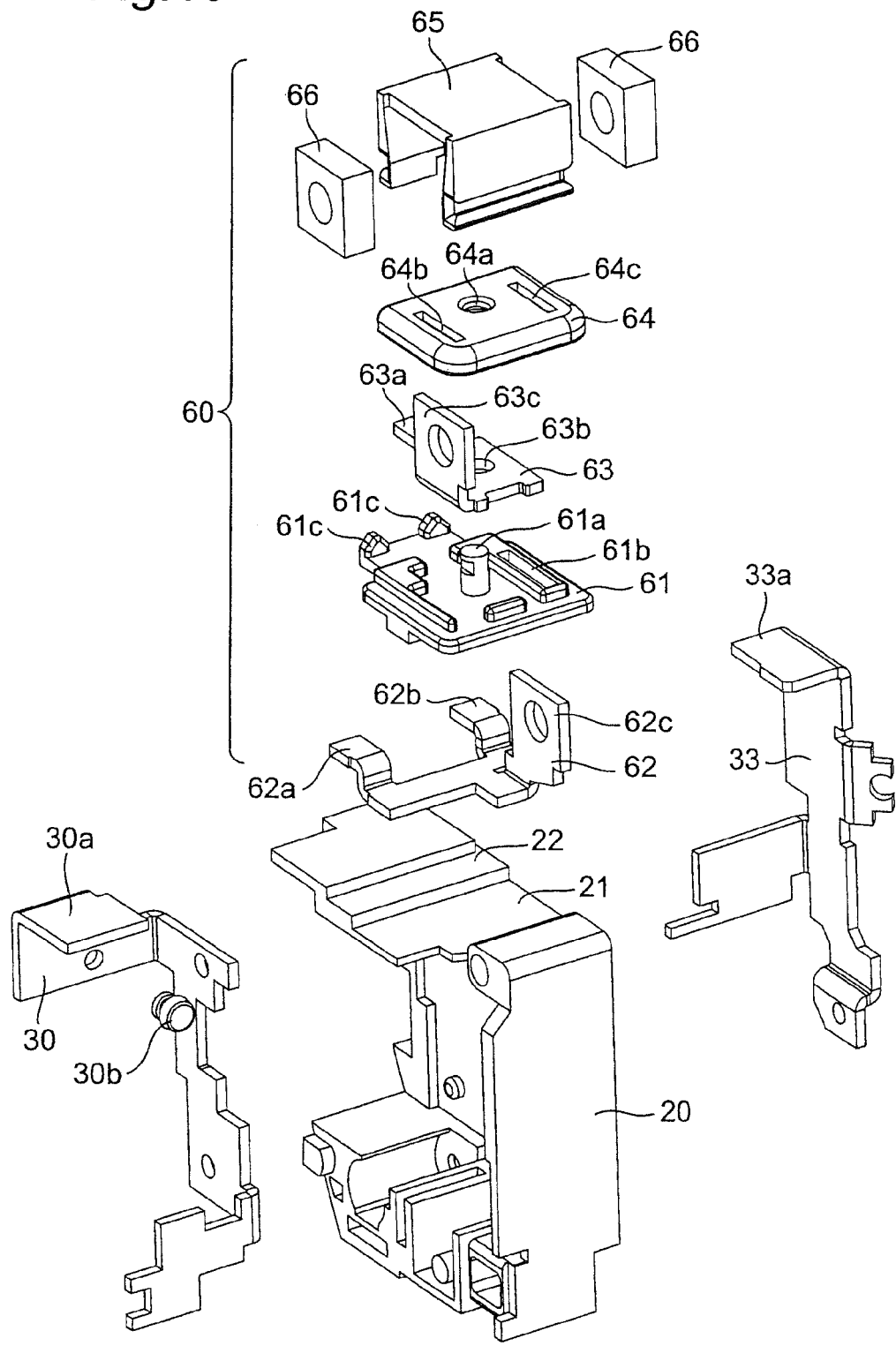
FIG. 19 is an exploded perspective view of a main section of the trigger switch shown in FIG. 16.
Figure 20:
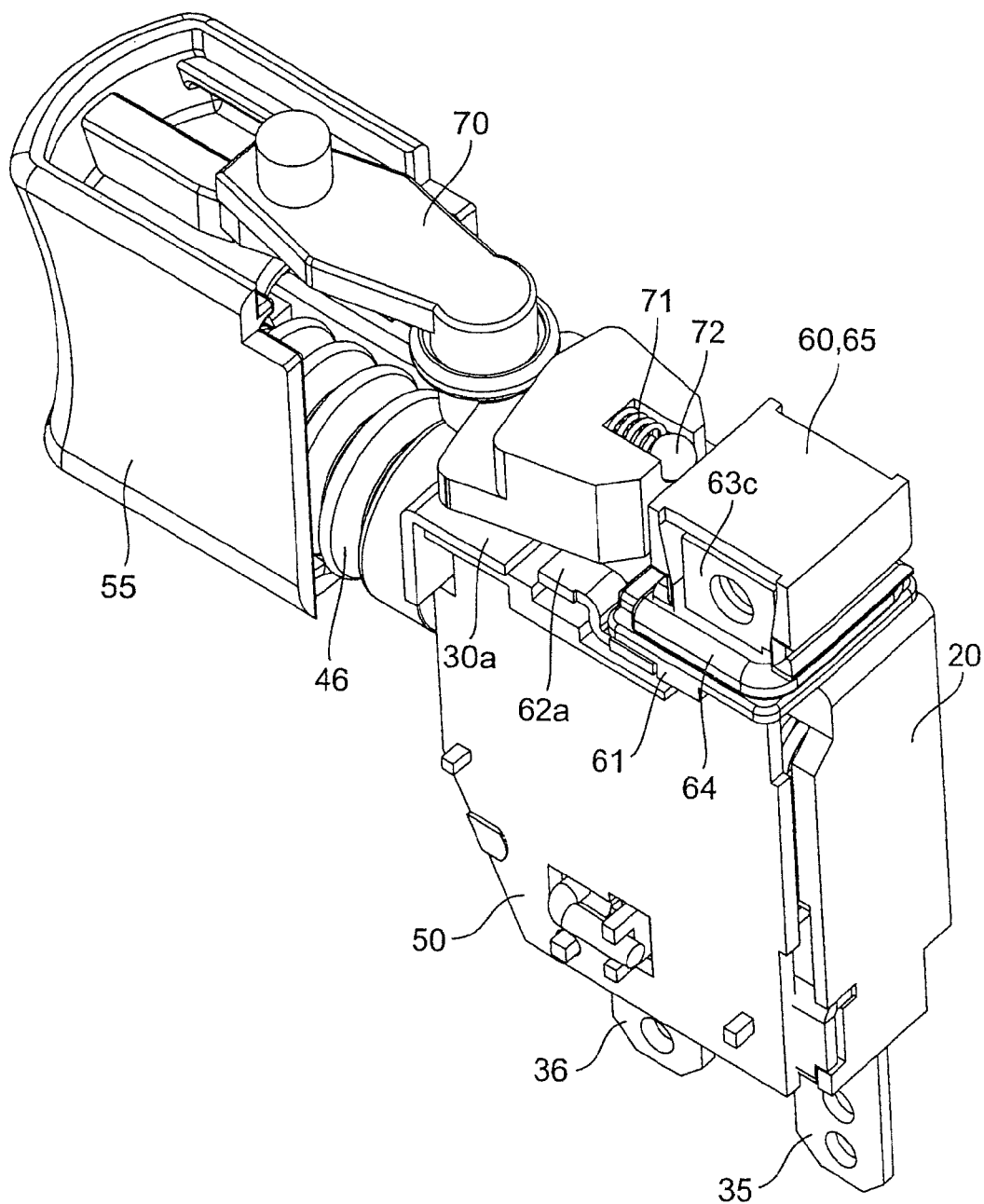
FIG. 20 is a perspective view showing a state where a housing and the like are removed from the trigger switch shown in FIG. 16.
Figure 21A:
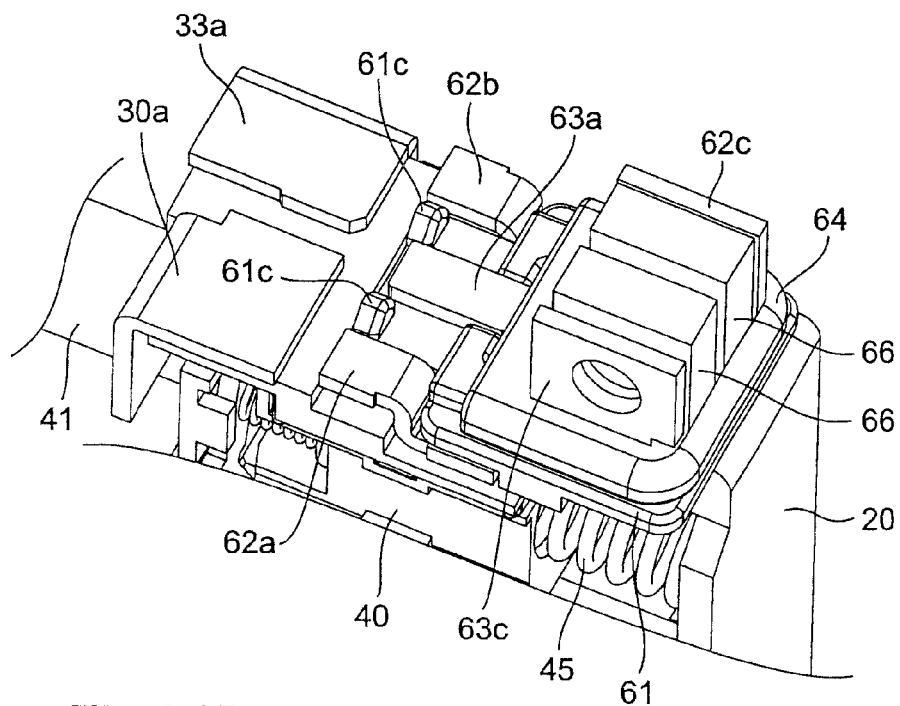
FIGS. 21A and 21B are enlarged perspective views of the main section of the trigger switch shown in FIG. 16.
Figure 21B:
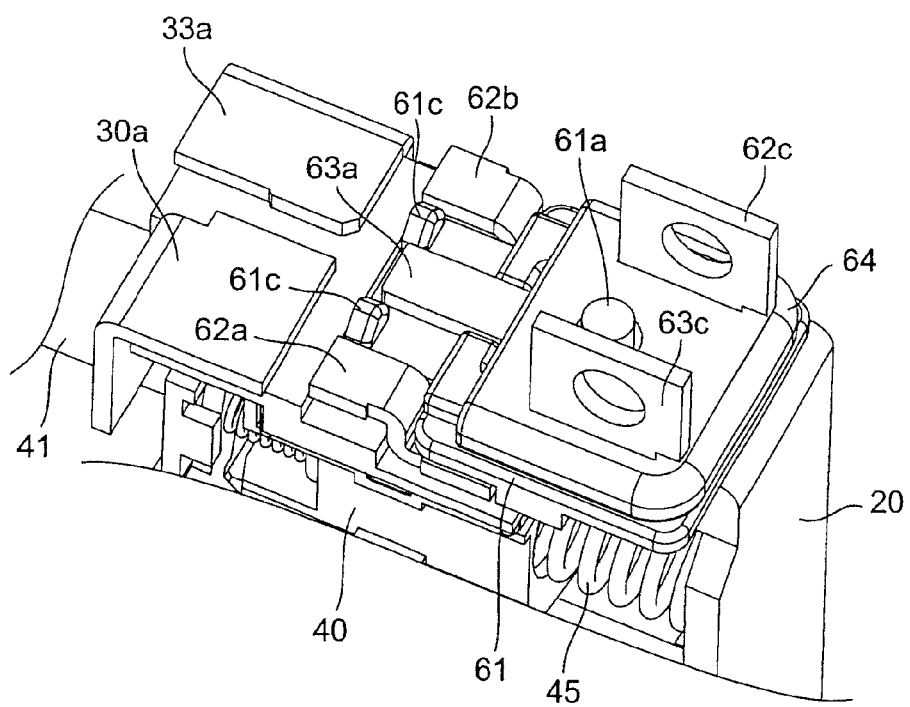
Figure 22:
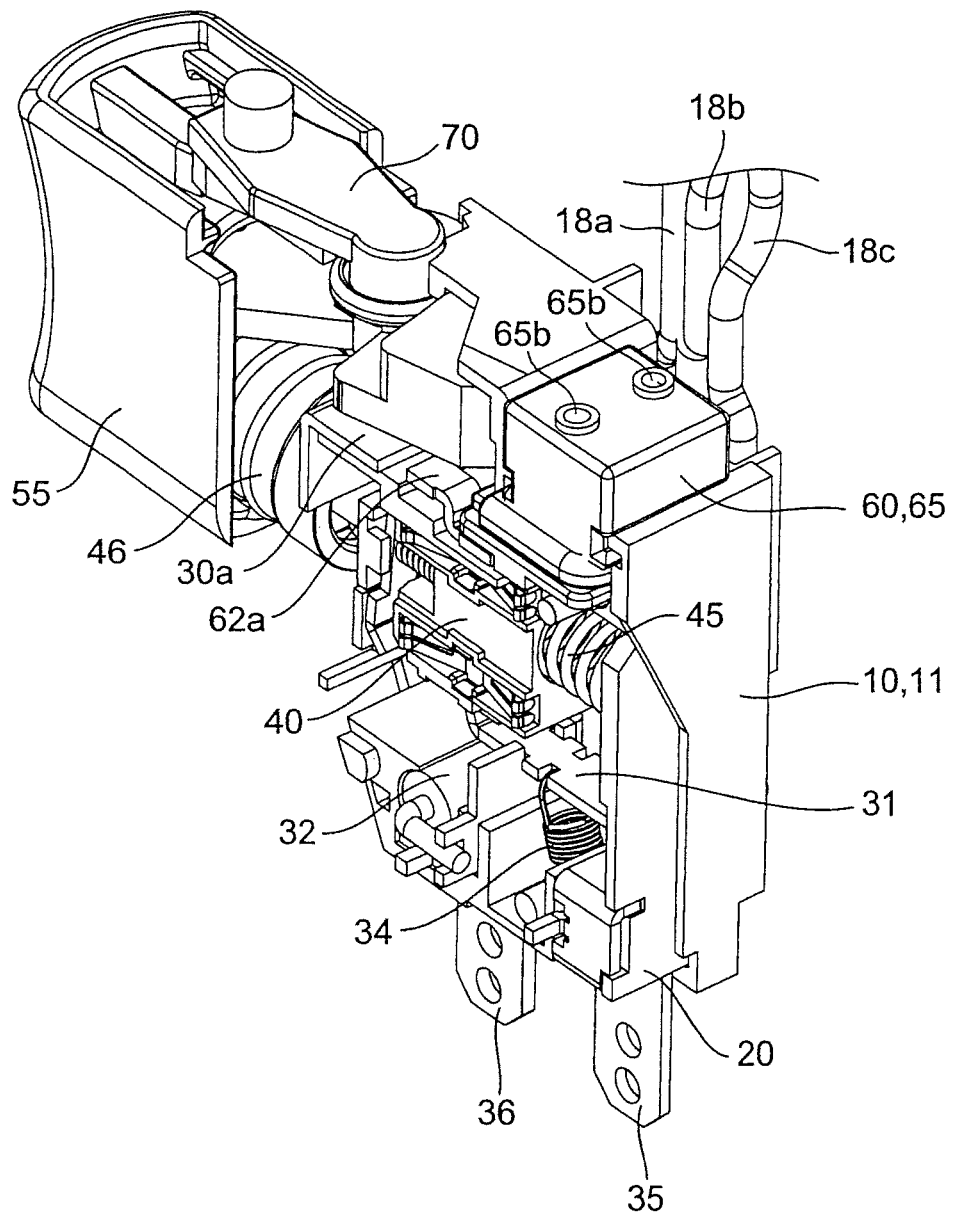
FIG. 22 is a perspective view of a trigger switch in a fourth embodiment of the present invention.
Figure 23:
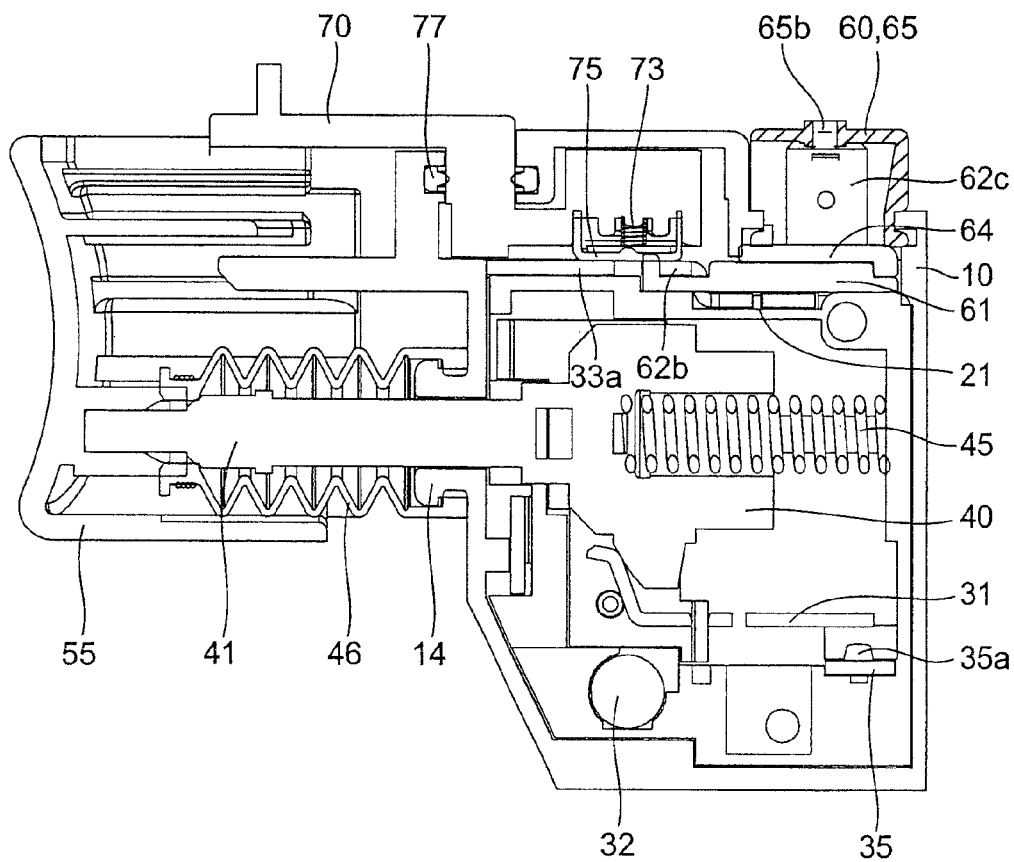
FIG. 23 is a front sectional view of the trigger switch shown in FIG. 22.

That is, as shown in FIG. 19, same as in the first embodiment, a terminal unit 60 includes a terminal plate 61, a tab terminal 62, a common tab terminal 63, a position restricting plate 64, and an insulating member 65.

Figure 18:
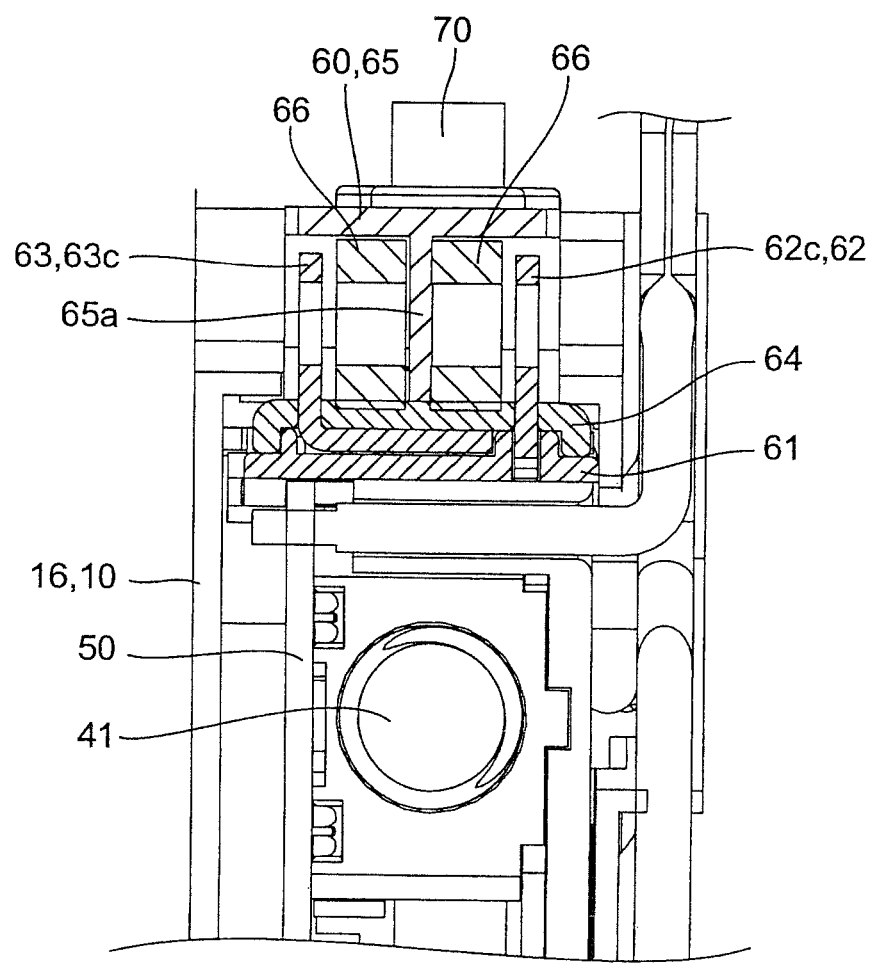
FIG. 18 is a partial sectional view of a right side face of the trigger switch shown in FIG. 16.

That is, the terminal plate 61 is provided with a terminal hole 61b on one side of a spindle 61a provided protruding at the center of its upper face, and has a pair of click-feeling protrusions 61c and 61c provided protruding on one edge thereof, and a projection 61d provided protruding on its lower face. Moreover, in the tab terminal 62, a pair of first and second fixed contacts 62a and 62b extend in parallel, and a terminal portion 62c is bent upward. Then, the tab terminal 62 is assembled by inserting the terminal portion 62c into a terminal hole 61b of the terminal plate 61. Further, the common tab terminal 63 has a common fixed contact 63a at a front end of its horizontal section, and is provided with a through hole 63b at the center of its horizontal section and a terminal portion 63c formed by being bent upward. Further, the position restricting plate 64 is provided with a through hole 64a at the center thereof and terminal holes 64b and 64c on both sides thereof. Subsequently, the insulating member 65 is a gate-like frame that can be placed on the position restricting plate 64, and has an insulating wall 65a provided protruding downward from its ceiling face (FIG. 18).

Therefore, in the terminal unit 60, the terminal portion 62c of the tab terminal 62 is inserted into the terminal hole 61b of the terminal plate 61 from below, and the spindle 61a of the terminal plate 61 is fitted into the through hole 63b of the common tab terminal 63. Further, the terminal portions 62c and 63c are fitted into the terminal holes 64c and 64b of the position restricting plate 64, respectively, to restrict positions of the terminal portions 62c and 63c. Subsequently, a pair of nuts 66 and 66 are disposed between the terminal portions 62c and 63c, and the insulating member 65 is placed on the upper face of the position restricting plate 64, whereby the nuts 66 and 66 are partitioned by an insulating wall of the insulating member 65 (FIG. 18).

Note that other members are the same as those in the first embodiment and thus, the same parts are given the same reference numerals and description thereof is omitted.

According to the third embodiment, an external terminal (not shown) can be connected to the tab terminal 62 and the common tab terminal 63 via bolts (not shown) screwed into the nuts 66 and 66, respectively. Therefore, according to the third embodiment, the external terminal can be rigidly connected, and a highly-reliable connection structure can be obtained. Moreover, since the volume including the nuts 66 and bolts increases, electric resistance decreases and a heat value generated by current flowing to the tab terminal can be suppressed, and an excellent heat radiation performance can also be achieved.

As shown in FIG. 22 to FIGS. 26A and 26B, a fourth embodiment is substantially the same as the above-described first embodiment except that a tab terminal has a push-in structure.

Figure 25A:
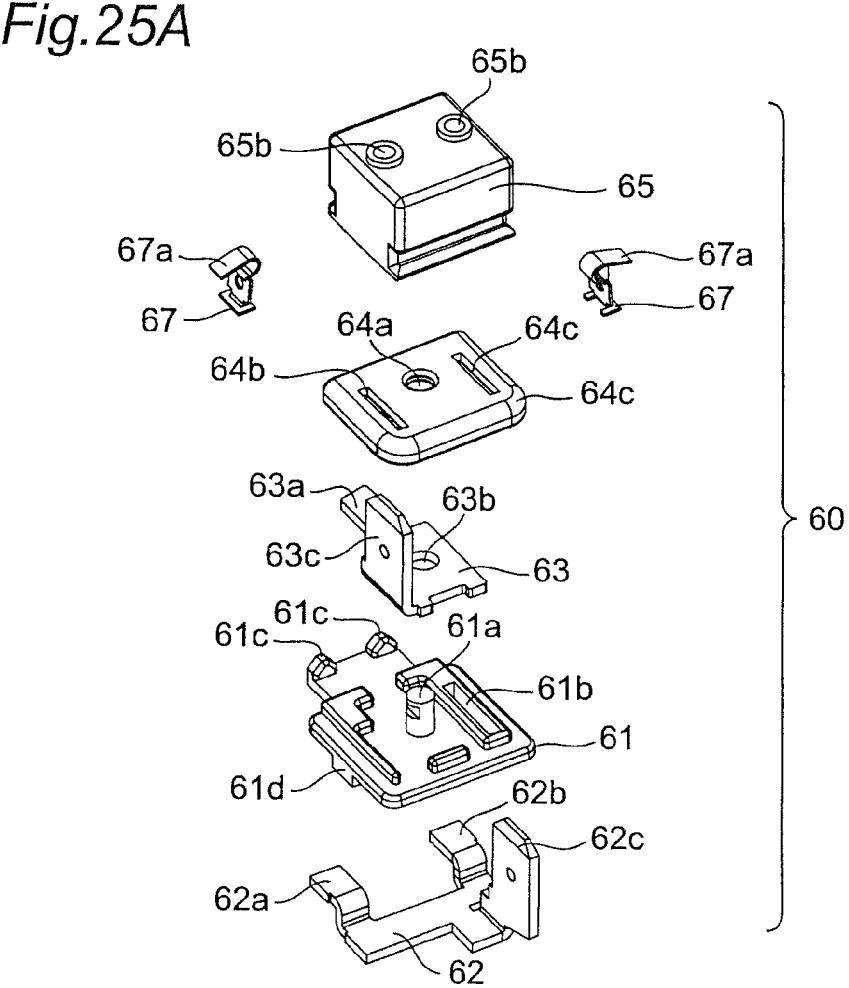
FIGS. 25A and 25B are an exploded perspective view of the main section of the trigger switch shown in FIG. 22 and a perspective view of an insulating member, respectively.
Figure 25B:
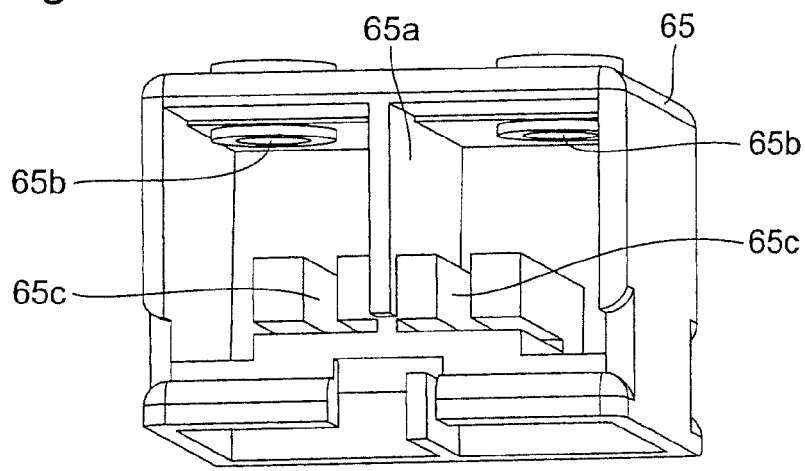
Figure 26A:
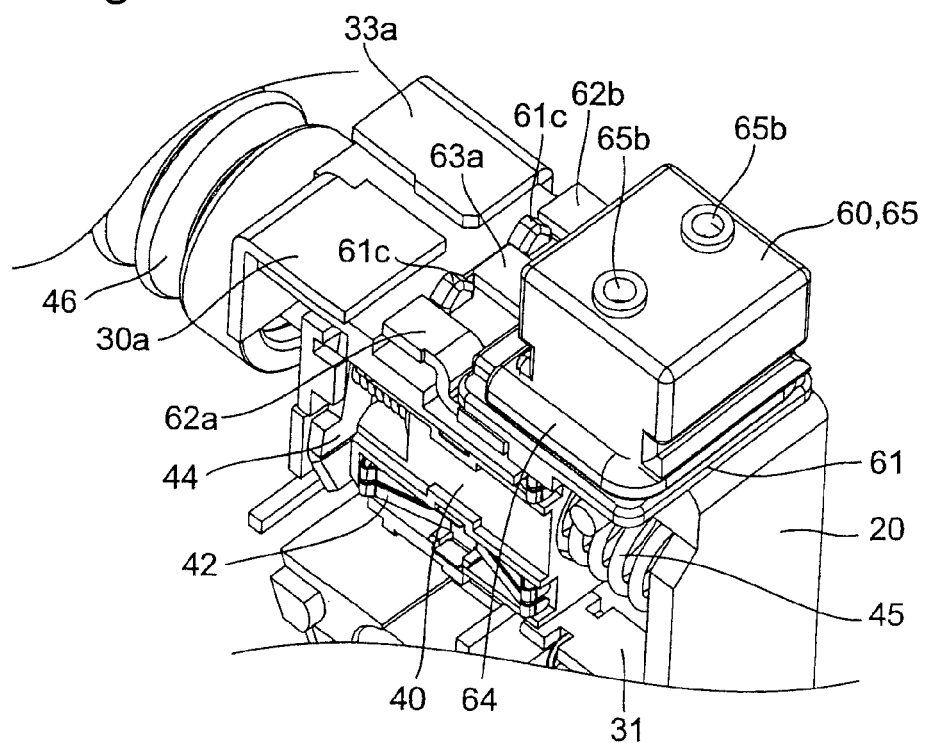
FIGS. 26A and 26B are enlarged perspective views of the main section of the trigger switch shown in FIG. 22.
Figure 26B:
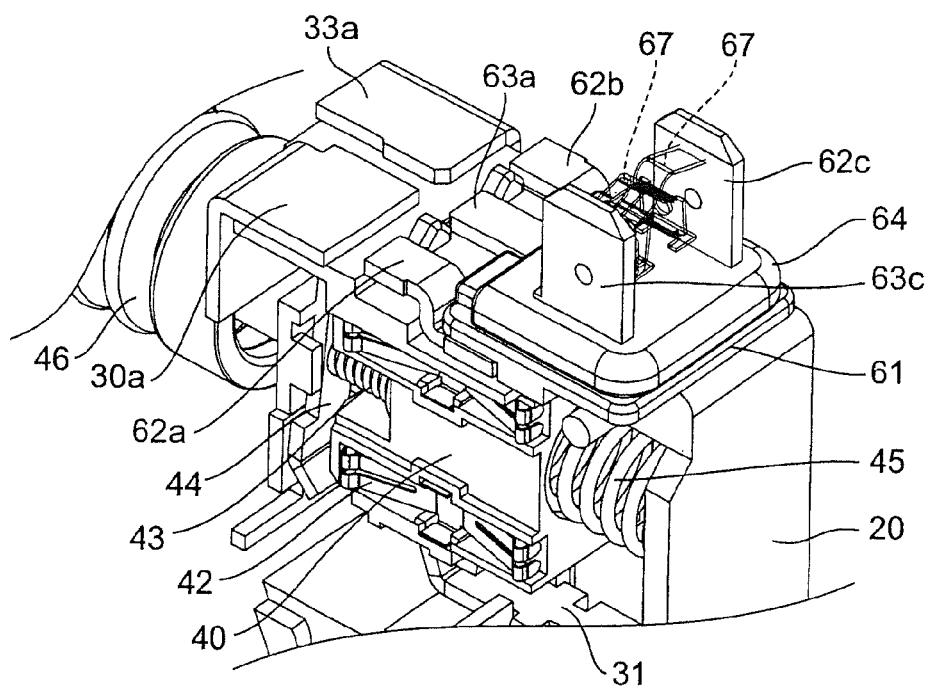

That is, as shown in FIGS. 25A and 25B, as in the first embodiment, a terminal unit includes a terminal plate 61, a tab terminal 62, a common tab terminal 63, a position restricting plate 64, and an insulating member 65.

The terminal plate 61 is provided with a terminal hole 61b on one side of a spindle 61a provided protruding at the center of its upper face, and has a pair of click-feeling protrusions 61c and 61c provided protruding on the other edge, and a projection 61d provided protruding on its lower face.

Moreover, in the tab terminal 62, a pair of first and second fixed contacts 62a and 62b extend in parallel, and a terminal portion 62c is bent upward. Then, the tab terminal 62 is assembled by inserting the terminal portion 62c into the terminal hole 61b of the terminal plate 61 from below.

Then, the common tab terminal 63 has a common fixed contact 63a at a front end of its horizontal section, and is provided with a through hole 63b at the center of its horizontal section and a terminal portion 63c formed by being bent upward.

Further, the position restricting plate 64 is provided with a through hole 64 at the center thereof, and terminal holes 64b and 64c on both sides thereof.

Subsequently, the insulating member 65 has a box-like shape that can be placed on the position restricting plate 64, and has an insulating wall 65a provided protruding downward on its ceiling face (FIG. 25B) and a pair of terminal holes 65b and 65b on its upper face. The insulating member 65 is further provided with slits 65c and 65c each having a substantially T-shaped cross section and having an opening on one side thereof to enable press-fitting.

Figure 24:
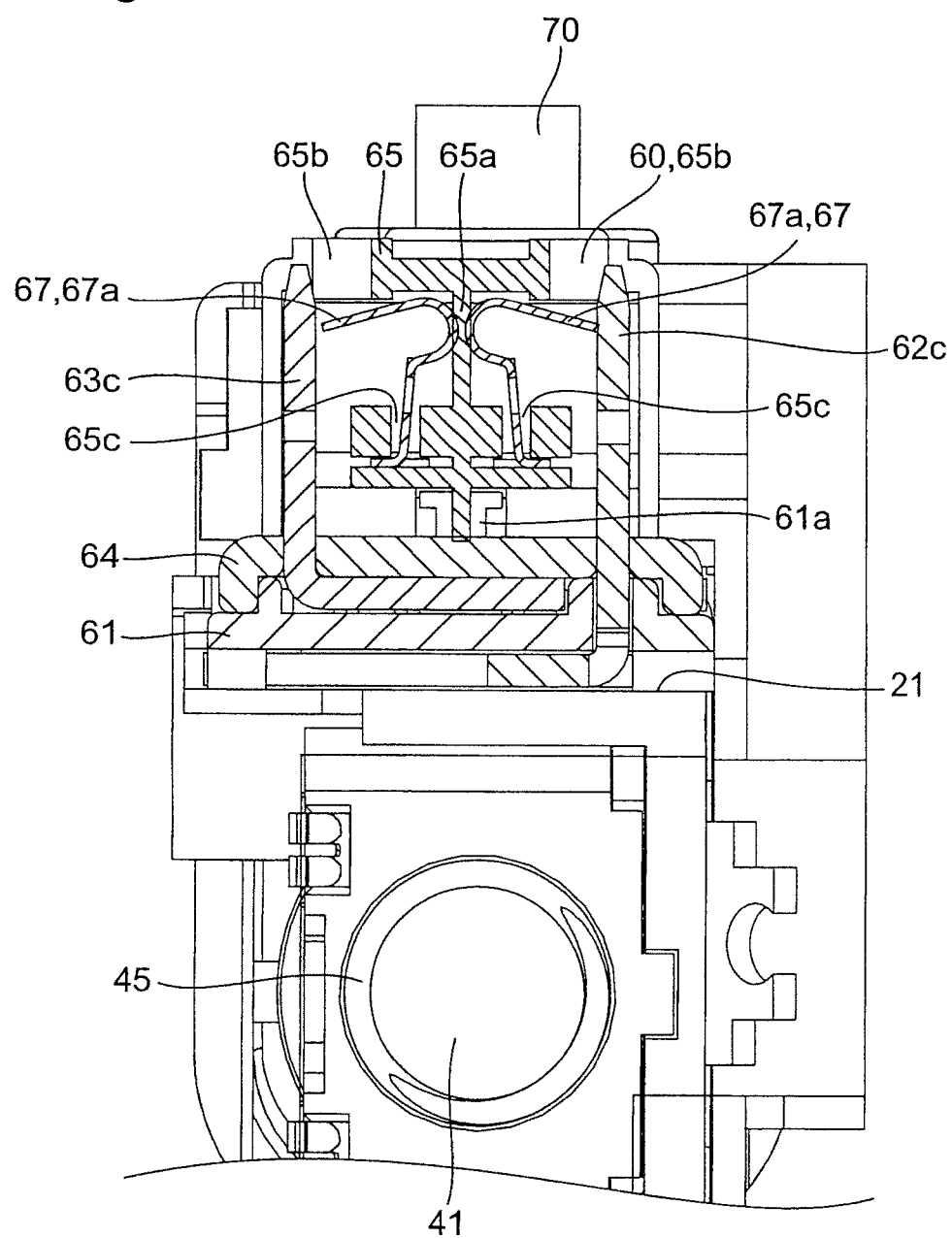
FIG. 24 is a partial sectional view of a right side face of the trigger switch shown in FIG. 22.

Therefore, in the terminal unit 60, the terminal portion 62c of the tab terminal 62 is inserted into the terminal hole 61b of the terminal plate 61 from below, and the spindle 61a of the terminal plate 61 is fitted into the through hole 63b of the common tab terminal 63. Further, the terminal portions 62c and 63c are fitted into the terminal holes 64c and 64b of the position restricting plate 64 to restrict positions of the terminal portions 62c and 63c. Subsequently, a pair of springs 67 and 67 are disposed between the terminal portions 62c and 63c and the insulating member 65 is placed on the upper face of the position restricting plate 64, whereby the springs 67 and 67 are partitioned by the insulating wall 65a of the insulating member 65 (FIG. 24).

Note that other members are the same as those in the first embodiment and thus, the same parts are given the same reference numerals and description thereof is omitted.

According to the fourth embodiment, when a pin terminal (not shown) is inserted into the terminal holes 65b and 65b of the insulating member 65 from the outside, the pin terminal is sandwiched between the terminal portions 62c and 63c and spring portions 67a and 67a of the springs 67 and 67, respectively. Therefore, according to the fourth embodiment, a highly-workable terminal connection structure that can connect the pin terminal with a single touch can be obtained.

Moreover, as a matter of course, the push-type terminal connection structure cannot only be applied to the vertical tab terminals as in the fourth embodiment, but can also be applied to the horizontal tab terminals as in the second embodiment.

The fourth embodiment includes the case where fixed contacts 30a and 33a of two first and second relay terminals 30 and 33, the first and second fixed contacts 62a and 62b of the tab terminal 62, and the common fixed contact 63a of the common tab terminal 63 are alternately switched by first and second rotational contact pieces 75 and 76.

However, the fourth embodiment is not limited thereto, and for example, a fixed contact of one relay terminal, fixed contacts of a tab terminal, and a common fixed contact of a common tab terminal may be switched by one rotational contact piece.

Moreover, fixed contacts of two first and second relay terminals, fixed contacts of a tab terminal, and a common fixed contact of a common tab terminal may be switched by first and second rotational contact pieces.

A terminal connection structure according to one or more embodiments of the present invention is not limited to application to a trigger switch for an electric power tool, and may be applied to other electric appliances, as a matter of course.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A terminal connection structure comprising:
    a housing;
    a base housed in the housing; and
    a terminal unit disposed on the base comprising:
        a pair of tab terminals comprising a pair of terminal portions provided in parallel, each of which is exposed from the housing and configured to be connected to an external terminal; and
        a terminal plate sandwiched between the pair of tab terminals,
    wherein the terminal unit is replaceable on the base, and
    wherein a pair of springs are disposed between the terminal portions of the pair of tab terminals, and
    wherein the external terminal is crimped to the terminal portions by a spring force of the springs.

2. The terminal connection structure according to claim 1, wherein the terminal portions of the pair of tab terminals extend so as to cross a surface of the housing.

3. The terminal connection structure according to claim 1, wherein an insulating wall is disposed between the terminal portions of the pair of tab terminals.

4. The terminal connection structure according to claim 3, wherein the insulating wall is formed integrally with a ceiling face of an insulating member having a gate-like cross section.

5. The terminal connection structure according to claim 1, wherein the terminal portions of the pair of tab terminals are inserted into a pair of terminal holes provided in a position restricting plate to restrict positions of the terminal portions.

\* \* \* \* \*